United States Patent
Miao et al.

(10) Patent No.: US 10,575,320 B2
(45) Date of Patent: Feb. 25, 2020

(54) DATA TRANSMISSION METHOD AND DEVICE

(71) Applicant: Huawei Technologies Co., Ltd., Shenzhen (CN)

(72) Inventors: Jinhua Miao, Beijing (CN); Wei Quan, Beijing (CN); Jian Zhang, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 15/664,387

(22) Filed: Jul. 31, 2017

(65) Prior Publication Data

US 2017/0332392 A1    Nov. 16, 2017

Related U.S. Application Data

(63) Continuation of application No. PCT/CN2015/071802, filed on Jan. 29, 2015.

(51) Int. Cl.
*H04W 72/12* (2009.01)
*H04W 72/04* (2009.01)

(52) U.S. Cl.
CPC ... *H04W 72/1242* (2013.01); *H04W 72/0446* (2013.01); *H04W 72/12* (2013.01); *H04W 72/1284* (2013.01)

(58) Field of Classification Search
None
See application file for complete search history.

(56) References Cited

U.S. PATENT DOCUMENTS 10,064,090 B2 *  8/2018  Lee .................. H04W 72/1242
                                                                370/328
2009/0316637 A1   12/2009 Yi et al.
(Continued)

FOREIGN PATENT DOCUMENTS

CN      101772174 A      7/2010
CN      101953199 A      1/2011
(Continued)

OTHER PUBLICATIONS

LG Electronics Inc, "Correction to Multiplexing Procedure for BSR," XP050140695, 3GPP TSG-RAN2 Meeting #62bis, R2-083275, Change Request, Jun. 30-Jul. 4, 2008, 2 pages.
(Continued)

*Primary Examiner* — Anh Vu H Ly
(74) *Attorney, Agent, or Firm* — Conley Rose, P.C.

(57) ABSTRACT

A method includes when a triggering instruction for triggering a periodic (buffer status report) BSR is received, obtaining a priority of a logical channel to which uplink data that is being sent belongs, and obtaining a priority of a logical channel to which the periodic BSR belongs, determining whether a priority of the uplink data is higher than a priority of the periodic BSR, and sending the uplink data to a base station at a priority higher than the priority of the periodic BSR when the priority of the uplink data is higher than the priority of the periodic BSR, or sending the periodic BSR to a base station at a priority higher than the priority of the uplink data when the priority of the uplink data is lower than the priority of the periodic BSR.

14 Claims, 9 Drawing Sheets

(56) References Cited

U.S. PATENT DOCUMENTS

| | | | |
|---|---|---|---|
| 2010/0074222 A1* | 3/2010 | Wu | H04L 1/1874 370/331 |
| 2010/0077100 A1* | 3/2010 | Hsu | H04W 72/1221 709/234 |
| 2010/0098011 A1* | 4/2010 | Pelletier | H04W 72/1242 370/329 |
| 2010/0150082 A1* | 6/2010 | Shin | H04W 72/1284 370/329 |
| 2010/0330995 A1 | 12/2010 | Aoyama et al. | |
| 2011/0143801 A1* | 6/2011 | Bucknell | H04L 1/1874 455/514 |
| 2011/0171967 A1* | 7/2011 | Lee | H04W 72/0486 455/452.1 |
| 2012/0033628 A1 | 2/2012 | Eriksson et al. | |
| 2012/0057547 A1* | 3/2012 | Lohr | H04L 5/0007 370/329 |
| 2013/0028223 A1* | 1/2013 | Kim | H04L 5/0007 370/329 |
| 2013/0107843 A1 | 5/2013 | Aoyama et al. | |
| 2013/0114445 A1* | 5/2013 | Wen | H04L 5/0007 370/252 |
| 2013/0322413 A1* | 12/2013 | Pelletier | H04W 72/1289 370/336 |
| 2014/0086088 A1* | 3/2014 | Zhi | H04W 72/1284 370/252 |
| 2014/0307674 A1 | 10/2014 | Feuersaenger et al. | |
| 2015/0003371 A1* | 1/2015 | Park | H04W 52/0238 370/329 |
| 2015/0043352 A1* | 2/2015 | Jang | H04W 72/1284 370/241 |
| 2015/0117342 A1* | 4/2015 | Loehr | H04W 72/1284 370/329 |
| 2015/0189570 A1 | 7/2015 | Chang et al. | |
| 2017/0013640 A1* | 1/2017 | Loehr | H04W 76/14 370/329 |

FOREIGN PATENT DOCUMENTS

| | | |
|---|---|---|
| CN | 102369778 A | 3/2012 |
| CN | 102905382 A | 1/2013 |
| CN | 103687037 A | 3/2014 |

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)," XP050377618, 3GPP TS 36.321, V8.2.0, Technical Specification, May 2008, 31 pages.

Foreign Communication From A Counterpart Application, European Application No. 15879368.7, Supplementary Partial European Search Report dated Dec. 11, 2017, 15 pages.

Machine Translation and Abstract of Chinese Publication No. CN101772174, Jul. 7, 2010, 10 pages.

Machine Translation and Abstract of Chinese Publication No. CN102905382, Jan. 30, 2013, 15 pages.

Foreign Communication From A Counterpart Application, PCT Application No. PCT/CN2015/071802, English Translation of International Search Report dated Oct. 30, 2015, 3 pages.

Foreign Communication From A Counterpart Application, PCT Application No. PCT/CN2015/071802, English Translation of Written Opinion dated Oct. 30, 2015, 7 pages.

Foreign Communication From A Counterpart Application, Chinese Application No. 201580002239.5, Chinese Office Action dated Apr. 8, 2019, 6 pages.

\* cited by examiner

DATA TRANSMISSION METHOD AND DEVICE

CROSS-REFERENCE TO RELATED APPLICATIONS

This application is a continuation of International Application No. PCT/CN2015/071802, filed on Jan. 29, 2015, the disclosure of which is hereby incorporated by reference in its entirety.

TECHNICAL FIELD

The present disclosure relates to the wireless communications field, and in particular, to a data transmission method and device.

BACKGROUND

In a long term evolution (LTE) system, to enable a base station to learn an uplink data amount of user equipment (UE) conveniently, the UE needs to report a buffer status report (BSR) to the base station. The base station learns the buffered uplink data amount on a UE side using the BSR, and allocates an uplink resource to the UE based on the uplink data amount such that the UE sends uplink data to the base station using the allocated uplink resource.

Currently, the BSR reported by the UE is classified into three types a regular BSR, a periodic BSR, and a padding BSR. When new uplink data is buffered on a logical channel of the UE and a priority of the logical channel is higher than a priority of a logical channel on which uplink data is buffered, or when there is no uplink data on a logical channel of the UE for a long time and new uplink data is buffered on a logical channel, the UE triggers the regular BSR. If the UE has an uplink resource, the UE reports the regular BSR to the base station, and in addition, starts or restarts a timer of the periodic BSR. The base station generates multiple uplink grants according to an uplink data amount carried in the regular BSR, and separately sends the multiple uplink grants to the UE. When any uplink grant in the multiple uplink grants is received, the UE sends uplink data corresponding to the uplink grant to the base station. Before the base station sends all the multiple uplink grants to the UE, if the timer of the periodic BSR expires, the UE triggers the periodic BSR, and reports the periodic BSR to the base station at a priority higher than a priority of a logical channel to which the uplink data belongs. Then, the base station continues to send, to the UE, an uplink grant that has not been sent such that the UE continues to send, to the base station, uplink data that has not been sent. In addition, the UE sends uplink data corresponding to the periodic BSR to the base station based on an uplink data amount carried in the periodic BSR.

When a priority of a logical channel to which uplink data that is being sent belongs is higher than a priority of the periodic BSR, if the periodic BSR is reported to the base station at a priority higher than the priority of the logical channel to which the uplink data belongs, the uplink data on the logical channel with a higher priority is segmented, and sending of the uplink data on the logical channel with a higher priority is delayed. In addition, when the base station receives, before sending all the multiple uplink grants to the UE, the periodic BSR sent by the UE, the uplink data amount carried in the periodic BSR includes an uplink data amount corresponding to an uplink grant that has not been sent. Consequently, uplink data corresponding to the regular BSR and the uplink data corresponding to the periodic BSR partly overlap. Therefore, redundancy of scheduled resources is caused when overlapped uplink data is scheduled based on the periodic BSR.

SUMMARY

Embodiments of the present disclosure provide a data transmission method and device, to avoid segmentation of uplink data on a logical channel with a high priority, avoid delayed sending of the uplink data on the logical channel with a high priority, and avoid redundancy of scheduled resources. The technical solutions are as follows.

According to a first aspect, a data transmission device is provided, where the device includes a processing unit configured to when a triggering instruction for triggering a periodic BSR is received, obtain a priority of a logical channel to which uplink data that is being sent belongs, and obtain a priority of a logical channel to which the periodic BSR belongs, where the processing unit is further configured to determine whether a priority of the uplink data is higher than a priority of the periodic BSR based on the priority of the logical channel to which the uplink data belongs and the priority of the logical channel to which the periodic BSR belongs, and a transmit unit configured to send the uplink data to a base station at a priority higher than the priority of the periodic BSR when the priority of the uplink data is higher than the priority of the periodic BSR, where the transmit unit is further configured to send the periodic BSR to the base station at a priority higher than the priority of the uplink data when the priority of the uplink data is lower than the priority of the periodic BSR.

With reference to the first aspect, in a first possible implementation of the first aspect, the device further includes a receiving unit configured to receive configuration information sent by the base station, where the configuration information includes a preset priority sequence and a priority identifier, the preset priority sequence is used to indicate a priority sequence among multiple logical channels of UE and a priority sequence between uplink data and a periodic BSR on each logical channel, where the processing unit is further configured to determine, based on the priority identifier, whether to use the preset priority sequence, and that a processing unit is configured to obtain a priority of a logical channel to which uplink data that is being sent belongs, and obtain a priority of a logical channel to which the periodic BSR belongs includes the processing unit is configured to when determining to use the preset priority sequence, obtain the priority of the logical channel to which the uplink data that is being sent belongs, and obtain the priority of the logical channel to which the periodic BSR belongs.

With reference to the first possible implementation of the first aspect, in a second possible implementation of the first aspect, that the processing unit is further configured to determine, based on the priority identifier, whether to use the preset priority sequence includes the processing unit is further configured to when the priority identifier is a first character, determine to use the preset priority sequence, or the processing unit is further configured to when the priority identifier is a second character, determine not to use the preset priority sequence.

With reference to any one of the first aspect, the first possible implementation of the first aspect, or the second possible implementation of the first aspect, in a third possible implementation of the first aspect, that the processing unit is further configured to determine whether a priority of the uplink data is higher than a priority of the periodic BSR based on the priority of the logical channel to which the uplink data belongs and the priority of the logical channel to which the periodic BSR belongs includes the processing unit is further configured to when the priority of the logical channel to which the uplink data belongs is higher than the priority of the logical channel to which the periodic BSR belongs, determine that the priority of the uplink data is higher than the priority of the periodic BSR, or the processing unit is further configured to when the priority of the logical channel to which the uplink data belongs is lower than or equal to the priority of the logical channel to which the periodic BSR belongs, determine that the priority of the uplink data is lower than the priority of the periodic BSR.

According to a second aspect, a data transmission device is provided, where the device includes a receiving unit configured to receive, in a process of transmitting uplink data corresponding to a first BSR by UE, a second BSR sent by the UE, a processing unit configured to calculate an uplink data amount scheduled in a period between a first sending time and a second BSR receiving time, where the first sending time is a time at which an uplink grant is last sent to the UE before the second BSR is received, and the processing unit is further configured to determine a to-be-scheduled uplink data amount according to an uplink data amount carried in the second BSR and the scheduled uplink data amount, and a transmit unit configured to send an uplink grant to the UE based on the to-be-scheduled uplink data amount, where the uplink grant is used to instruct the UE to send to-be-scheduled uplink data to a base station.

With reference to the second aspect, in a first possible implementation of the second aspect, that the processing unit is further configured to determine a to-be-scheduled uplink data amount according to an uplink data amount carried in the second BSR and the scheduled uplink data amount includes the processing unit is further configured to calculate a difference between the uplink data amount carried in the second BSR and the scheduled uplink data amount, and the processing unit is further configured to determine the calculated difference as the to-be-scheduled uplink data amount.

With reference to the second aspect or the first possible implementation of the second aspect, in a second possible implementation of the second aspect, that a transmit unit is configured to send an uplink grant to the UE based on the to-be-scheduled uplink data amount, where the uplink grant is used to instruct the UE to send to-be-scheduled uplink data to a base station includes the processing unit is further configured to generate multiple uplink grants based on the to-be-scheduled uplink data amount, the processing unit is further configured to allocate an uplink grant identifier to each of the multiple uplink grants, to obtain multiple uplink grant identifiers, and the transmit unit is further configured to send the multiple uplink grants and the multiple uplink grant identifiers to the UE such that the UE sends the to-be-scheduled uplink data to the base station.

With reference to the second possible implementation of the second aspect, in a third possible implementation of the second aspect, that the transmit unit is further configured to send the multiple uplink grants and the multiple uplink grant identifiers to the UE such that the UE sends the to-be-scheduled uplink data to the base station includes the transmit unit is further configured to for any uplink grant in the multiple uplink grants, send the uplink grant and an uplink grant identifier corresponding to the uplink grant to the UE such that the UE sends uplink data corresponding to the uplink grant and a first uplink grant identifier to the base station, where the first uplink grant identifier is an uplink grant identifier that is last received by the UE before the uplink grant is received, the processing unit is further configured to obtain a second uplink grant identifier when the uplink data and the first uplink grant identifier that are sent by the UE are received, where the second uplink grant identifier is an uplink grant identifier that is last sent by the base station before the uplink grant is sent to the UE, the processing unit is further configured to if the first uplink grant identifier and the second uplink grant identifier are the same, determine that a last uplink grant sent to the UE is not lost, and the transmit unit is further configured to send a next uplink grant and an uplink grant identifier corresponding to the next uplink grant to the UE, where the last uplink grant is an uplink grant that is last sent to the UE before the uplink grant.

With reference to any one of the second aspect, the first possible implementation of the second aspect, the second possible implementation of the second aspect, or the third possible implementation of the second aspect, in a fourth possible implementation of the second aspect, the uplink grant identifier is an uplink grant sequence number or an uplink grant timestamp.

According to a third aspect, a data transmission device is provided, where the device includes a processing unit configured to when UE is connected to multiple base stations and receives a BSR triggering instruction, separately calculate offloading factors of the multiple base stations based on parameter information of the multiple base stations, where the parameter information includes channel quality, load on a base station, and a distance between the UE and a base station, where the processing unit is further configured to separately multiply a total buffered uplink data amount by the offloading factors of the multiple base stations, to obtain uplink data amounts corresponding to the multiple base stations, and a transmit unit configured to for each base station in the multiple base stations, send a corresponding BSR to the base station such that the base station sends an uplink grant to the UE, where the uplink grant is used to instruct the UE to send buffered uplink data to the base station, and the BSR carries an uplink data amount corresponding to the base station.

With reference to the third aspect, in a first possible implementation of the third aspect, that a processing unit is configured to when UE is connected to multiple base stations and receives a BSR triggering instruction, separately calculate offloading factors of the multiple base stations based on parameter information of the multiple base stations includes the processing unit is further configured to when the UE is connected to the multiple base stations and receives the BSR triggering instruction, separately calculate offloading parameters corresponding to the multiple base stations based on the parameter information of the multiple base stations, the processing unit is further configured to for each base station in the multiple base stations, calculate a proportion of an offloading parameter corresponding to the base station in a total offloading parameter, where the total offloading parameter is a sum of the offloading parameters corresponding to the multiple base stations, and the processing unit is further configured to determine the calculated proportion as an offloading factor of the base station.

According to a fourth aspect, a data transmission device is provided, where the device includes a processor configured to when a triggering instruction for triggering a periodic BSR is received, obtain a priority of a logical channel to which uplink data that is being sent belongs, and obtain a priority of a logical channel to which the periodic BSR belongs, where the processor is further configured to determine whether a priority of the uplink data is higher than a priority of the periodic BSR based on the priority of the logical channel to which the uplink data belongs and the priority of the logical channel to which the periodic BSR belongs, and a transmitter configured to send the uplink data to a base station at a priority higher than the priority of the periodic BSR when the priority of the uplink data is higher than the priority of the periodic BSR, where the transmitter is further configured to send the periodic BSR to the base station at a priority higher than the priority of the uplink data when the priority of the uplink data is lower than the priority of the periodic BSR.

With reference to the fourth aspect, in a first possible implementation of the fourth aspect, the device further includes a receiver configured to receive configuration information sent by the base station, where the configuration information includes a preset priority sequence and a priority identifier, the preset priority sequence is used to indicate a priority sequence among multiple logical channels of UE and a priority sequence between uplink data and a periodic BSR on each logical channel, where the processor is further configured to determine, based on the priority identifier, whether to use the preset priority sequence, and that a processor is configured to obtain a priority of a logical channel to which uplink data that is being sent belongs, and obtain a priority of a logical channel to which the periodic BSR belongs includes the processor is further configured to when determining to use the preset priority sequence, obtain the priority of the logical channel to which the uplink data that is being sent belongs, and obtain the priority of the logical channel to which the periodic BSR belongs.

With reference to the first possible implementation of the fourth aspect, in a second possible implementation of the fourth aspect, that the processor is further configured to determine, based on the priority identifier, whether to use the preset priority sequence includes the processor is further configured to when the priority identifier is a first character, determine to use the preset priority sequence, or the processor is further configured to when the priority identifier is a second character, determine not to use the preset priority sequence.

With reference to any one of the fourth aspect, the first possible implementation of the fourth aspect, or the second possible implementation of the fourth aspect, in a third possible implementation of the fourth aspect, that the processor is further configured to determine whether a priority of the uplink data is higher than a priority of the periodic BSR based on the priority of the logical channel to which the uplink data belongs and the priority of the logical channel to which the periodic BSR belongs includes the processor is further configured to when the priority of the logical channel to which the uplink data belongs is higher than the priority of the logical channel to which the periodic BSR belongs, determine that the priority of the uplink data is higher than the priority of the periodic BSR, or the processor is further configured to when the priority of the logical channel to which the uplink data belongs is lower than or equal to the priority of the logical channel to which the periodic BSR belongs, determine that the priority of the uplink data is lower than the priority of the periodic BSR.

According to a fifth aspect, a data transmission device is provided, where the device includes a receiver configured to receive, in a process of transmitting uplink data corresponding to a first BSR by UE, a second BSR sent by the UE, a processor configured to calculate an uplink data amount scheduled in a period between a first sending time and a second BSR receiving time, where the first sending time is a time at which an uplink grant is last sent to the UE before the second BSR is received, and the processor is further configured to determine a to-be-scheduled uplink data amount according to an uplink data amount carried in the second BSR and the scheduled uplink data amount, and a transmitter configured to send an uplink grant to the UE based on the to-be-scheduled uplink data amount, where the uplink grant is used to instruct the UE to send to-be-scheduled uplink data to a base station.

With reference to the fifth aspect, in a first possible implementation of the fifth aspect, that the processor is further configured to determine a to-be-scheduled uplink data amount according to an uplink data amount carried in the second BSR and the scheduled uplink data amount includes the processor is further configured to calculate a difference between the uplink data amount carried in the second BSR and the scheduled uplink data amount, and the processor is further configured to determine the calculated difference as the to-be-scheduled uplink data amount.

With reference to the fifth aspect or the first possible implementation of the fifth aspect, in a second possible implementation of the fifth aspect, that a transmitter is configured to send an uplink grant to the UE based on the to-be-scheduled uplink data amount, where the uplink grant is used to instruct the UE to send to-be-scheduled uplink data to a base station includes the processor is further configured to generate multiple uplink grants based on the to-be-scheduled uplink data amount, the processor is further configured to allocate an uplink grant identifier to each of the multiple uplink grants, to obtain multiple uplink grant identifiers, and the transmitter is further configured to send the multiple uplink grants and the multiple uplink grant identifiers to the UE such that the UE sends the to-be-scheduled uplink data to the base station.

With reference to the second possible implementation of the fifth aspect, in a third possible implementation of the fifth aspect, that the transmitter is further configured to send the multiple uplink grants and the multiple uplink grant identifiers to the UE such that the UE sends the to-be-scheduled uplink data to the base station includes the transmitter is further configured to for any uplink grant in the multiple uplink grants, send the uplink grant and an uplink grant identifier corresponding to the uplink grant to the UE such that the UE sends uplink data corresponding to the uplink grant and a first uplink grant identifier to the base station, where the first uplink grant identifier is an uplink grant identifier that is last received by the UE before the uplink grant is received, the processor is further configured to obtain a second uplink grant identifier when the uplink data and the first uplink grant identifier that are sent by the UE are received, where the second uplink grant identifier is an uplink grant identifier that is last sent by the base station before the uplink grant is sent to the UE, the processor is further configured to if the first uplink grant identifier and the second uplink grant identifier are the same, determine that a last uplink grant sent to the UE is not lost, and the transmitter is further configured to send a next uplink grant and an uplink grant identifier corresponding to the next uplink grant to the UE, where the last uplink grant is an uplink grant that is last sent to the UE before the uplink grant.

With reference to any one of the fifth aspect, the first possible implementation of the fifth aspect, the second possible implementation of the fifth aspect, or the third possible implementation of the fifth aspect, in a fourth possible implementation of the fifth aspect, the uplink grant identifier is an uplink grant sequence number or an uplink grant timestamp.

According to a sixth aspect, a data transmission device is provided, where the device includes a processor configured to when UE is connected to multiple base stations and receives a BSR triggering instruction, separately calculate offloading factors of the multiple base stations based on parameter information of the multiple base stations, where the parameter information includes channel quality, load on a base station, and a distance between the UE and a base station, where the processor is further configured to separately multiply a total buffered uplink data amount by the offloading factors of the multiple base stations, to obtain uplink data amounts corresponding to the multiple base stations, and a transmitter configured to for each base station in the multiple base stations, send a corresponding BSR to the base station such that the base station sends an uplink grant to the UE, where the uplink grant is used to instruct the UE to send buffered uplink data to the base station, and the BSR carries an uplink data amount corresponding to the base station.

With reference to the sixth aspect, in a first possible implementation of the sixth aspect, that a processor is configured to when UE is connected to multiple base stations and receives a BSR triggering instruction, separately calculate offloading factors of the multiple base stations based on parameter information of the multiple base stations includes the processor is further configured to separately calculate offloading parameters corresponding to the multiple base stations based on the parameter information of the multiple base stations, the processor is further configured to for each base station in the multiple base stations, calculate a proportion of an offloading parameter corresponding to the base station in a total offloading parameter, where the total offloading parameter is a sum of the offloading parameters corresponding to the multiple base stations, and the processor is further configured to determine the calculated proportion as an offloading factor of the base station.

According to a seventh aspect, a data transmission method is provided, where the method includes when a triggering instruction for triggering a periodic BSR is received, obtaining a priority of a logical channel to which uplink data that is being sent belongs, and obtaining a priority of a logical channel to which the periodic BSR belongs, where determining whether a priority of the uplink data is higher than a priority of the periodic BSR based on the priority of the logical channel to which the uplink data belongs and the priority of the logical channel to which the periodic BSR belongs, and sending the uplink data to a base station at a priority higher than the priority of the periodic BSR when the priority of the uplink data is higher than the priority of the periodic BSR, or sending the periodic BSR to the base station at a priority higher than the priority of the uplink data when the priority of the uplink data is lower than the priority of the periodic BSR.

With reference to the seventh aspect, in a first possible implementation of the seventh aspect, the obtaining a priority of a logical channel to which uplink data that is being sent belongs, and obtaining a priority of a logical channel to which the periodic BSR belongs, the method further includes receiving configuration information sent by the base station, where the configuration information includes a preset priority sequence and a priority identifier, the preset priority sequence is used to indicate a priority sequence among multiple logical channels of UE and a priority sequence between uplink data and a periodic BSR on each logical channel, and determining, based on the priority identifier, whether to use the preset priority sequence, and the obtaining a priority of a logical channel to which uplink data that is being sent belongs, and obtaining a priority of a logical channel to which the periodic BSR belongs includes when determining to use the preset priority sequence, obtaining the priority of the logical channel to which the uplink data that is being sent belongs, and obtaining the priority of the logical channel to which the periodic BSR belongs.

With reference to the first possible implementation of the seventh aspect, in a second possible implementation of the seventh aspect, the determining, based on the priority identifier, whether to use the preset priority sequence includes when the priority identifier is a first character, determining to use the preset priority sequence, or when the priority identifier is a second character, determining not to use the preset priority sequence.

With reference to any one of the seventh aspect, the first possible implementation of the seventh aspect, or the second possible implementation of the seventh aspect, in a third possible implementation of the seventh aspect, the determining whether a priority of the uplink data is higher than a priority of the periodic BSR based on the priority of the logical channel to which the uplink data belongs and the priority of the logical channel to which the periodic BSR belongs includes when the priority of the logical channel to which the uplink data belongs is higher than the priority of the logical channel to which the periodic BSR belongs, determining that the priority of the uplink data is higher than the priority of the periodic BSR, or when the priority of the logical channel to which the uplink data belongs is lower than or equal to the priority of the logical channel to which the periodic BSR belongs, determining that the priority of the uplink data is lower than the priority of the periodic BSR.

According to an eighth aspect, a data transmission method is provided, where the method includes receiving, in a process of transmitting uplink data corresponding to a first BSR by UE, a second BSR sent by the UE, calculating an uplink data amount scheduled in a period between a first sending time and a second BSR receiving time, where the first sending time is a time at which an uplink grant is last sent to the UE before the second BSR is received, determining a to-be-scheduled uplink data amount according to an uplink data amount carried in the second BSR and the scheduled uplink data amount, and sending an uplink grant to the UE based on the to-be-scheduled uplink data amount, where the uplink grant is used to instruct the UE to send to-be-scheduled uplink data to a base station.

With reference to the eighth aspect, in a first possible implementation of the eighth aspect, the determining a to-be-scheduled uplink data amount according to an uplink data amount carried in the second BSR and the scheduled uplink data amount includes calculating a difference between the uplink data amount carried in the second BSR and the scheduled uplink data amount, and determining the calculated difference as the to-be-scheduled uplink data amount.

With reference to the eighth aspect or the first possible implementation of the eighth aspect, in a second possible implementation of the eighth aspect, the sending an uplink grant to the UE based on the to-be-scheduled uplink data amount, where the uplink grant is used to instruct the UE to send to-be-scheduled uplink data to a base station includes generating multiple uplink grants based on the to-be-scheduled uplink data amount, allocating an uplink grant identifier to each of the multiple uplink grants, to obtain multiple uplink grant identifiers, and sending the multiple uplink grants and the multiple uplink grant identifiers to the UE such that the UE sends the to-be-scheduled uplink data to the base station.

With reference to the second possible implementation of the eighth aspect, in a third possible implementation of the eighth aspect, the sending the multiple uplink grants and the multiple uplink grant identifiers to the UE such that the UE sends the to-be-scheduled uplink data to the base station includes for any uplink grant in the multiple uplink grants, sending the uplink grant and an uplink grant identifier corresponding to the uplink grant to the UE such that the UE sends uplink data corresponding to the uplink grant and a first uplink grant identifier to the base station, where the first uplink grant identifier is an uplink grant identifier that is last received by the UE before the uplink grant is received, obtaining a second uplink grant identifier when the uplink data and the first uplink grant identifier that are sent by the UE are received, where the second uplink grant identifier is an uplink grant identifier that is last sent by the base station before the uplink grant is sent to the UE, if the first uplink grant identifier and the second uplink grant identifier are the same, determining that a last uplink grant sent to the UE is not lost, and sending a next uplink grant and an uplink grant identifier corresponding to the next uplink grant to the UE, where the last uplink grant is an uplink grant that is last sent to the UE before the uplink grant.

With reference to any one of the eighth aspect, the first possible implementation of the eighth aspect, the second possible implementation of the eighth aspect, or the third possible implementation of the eighth aspect, in a fourth possible implementation of the eighth aspect, the uplink grant identifier is an uplink grant sequence number or an uplink grant timestamp.

According to a ninth aspect, a data transmission method is provided, where the method includes when UE is connected to multiple base stations and receives a BSR triggering instruction, separately calculating offloading factors of the multiple base stations based on parameter information of the multiple base stations, where the parameter information includes channel quality, load on a base station, and a distance between the UE and a base station, separately multiplying a total buffered uplink data amount by the offloading factors of the multiple base stations, to obtain uplink data amounts corresponding to the multiple base stations, and for each base station in the multiple base stations, sending a corresponding BSR to the base station such that the base station sends an uplink grant to the UE, where the uplink grant is used to instruct the UE to send buffered uplink data to the base station, and the BSR carries an uplink data amount corresponding to the base station.

With reference to the ninth aspect, in a first possible implementation of the ninth aspect, the separately calculating offloading factors of the multiple base stations based on parameter information of the multiple base stations includes separately calculating offloading parameters corresponding to the multiple base stations based on the parameter information of the multiple base stations, for each base station in the multiple base stations, calculating a proportion of an offloading parameter corresponding to the base station in a total offloading parameter, where the total offloading parameter is a sum of the offloading parameters corresponding to the multiple base stations, and determining the calculated proportion as an offloading factor of the base station.

Beneficial effects of the technical solutions provided in the embodiments of the present disclosure are as follows.

In this embodiment of the present disclosure, when a priority of a logical channel to which uplink data that is being sent belongs is higher than a priority of a logical channel to which a periodic BSR belongs, it is determined that a priority of the uplink data that is being sent is higher than a priority of the periodic BSR. In this case, the uplink data is sent to a base station at a priority higher than the priority of the periodic BSR, thereby avoiding that the periodic BSR on the logical channel with a lower priority occupies more uplink resources, avoiding segmentation of the uplink data on the logical channel with a higher priority, and avoiding delayed sending of the uplink data on the logical channel with a higher priority. In addition, when a second BSR sent by UE is received, a base station calculates an uplink data amount scheduled in a period between a first sending time and a second BSR receiving time, calculates a difference between an uplink data amount carried in the second BSR and the scheduled uplink data amount, and determines the calculated difference as a to-be-scheduled uplink data amount. The to-be-scheduled uplink data does not include uplink data corresponding to a first BSR, thereby avoiding redundancy of scheduled resources, and saving scheduled resources.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
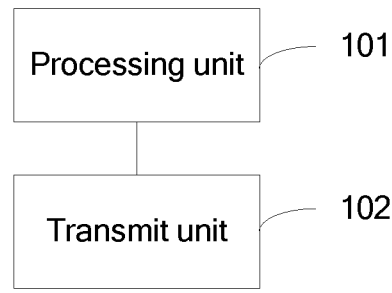
FIG. 1 is a schematic structural diagram of a first data transmission device according to an embodiment of the present disclosure.

FIG. 1 is a schematic structural diagram of a first data transmission device according to an embodiment of the present disclosure. Referring to FIG. 1, the device includes a processing unit 101 configured to when a triggering instruction for triggering a periodic BSR is received, obtain a priority of a logical channel to which uplink data that is being sent belongs, and obtain a priority of a logical channel to which the periodic BSR belongs, where the processing unit 101 is further configured to determine whether a priority of the uplink data is higher than a priority of the periodic BSR based on the priority of the logical channel to which the uplink data belongs and the priority of the logical channel to which the periodic BSR belongs, and a transmit unit 102 configured to send the uplink data to a base station at a priority higher than the priority of the periodic BSR when the priority of the uplink data is higher than the priority of the periodic BSR, where the transmit unit 102 is further configured to send the periodic BSR to the base station at a priority higher than the priority of the uplink data when the priority of the uplink data is lower than the priority of the periodic BSR.

Figure 2:
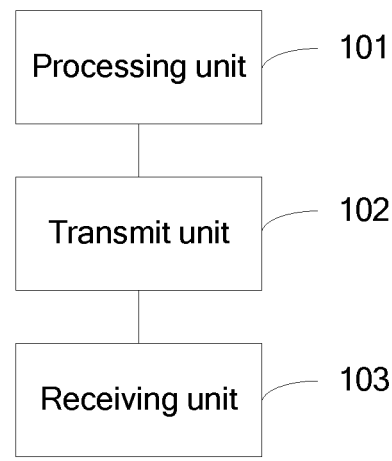
FIG. 2 is a schematic structural diagram of a first data transmission device according to an embodiment of the present disclosure.

Optionally, referring to FIG. 2, the device further includes a receiving unit 103 configured to receive configuration information sent by the base station, where the configuration information includes a preset priority sequence and a priority identifier, the preset priority sequence is used to indicate a priority sequence among multiple logical channels of UE and a priority sequence between uplink data and a periodic BSR on each logical channel.

The processing unit 101 is further configured to determine, based on the priority identifier, whether to use the preset priority sequence.

That a processing unit 101 is configured to obtain a priority of a logical channel to which uplink data that is being sent belongs, and obtain a priority of a logical channel to which the periodic BSR belongs includes the processing unit 101 is further configured to when determining to use the preset priority sequence, obtain the priority of the logical channel to which the uplink data that is being sent belongs, and obtain the priority of the logical channel to which the periodic BSR belongs.

Optionally, that the processing unit 101 is further configured to determine, based on the priority identifier, whether to use the preset priority sequence includes the processing unit 101 is further configured to when the priority identifier is a first character, determine to use the preset priority sequence, or the processing unit 101 is further configured to when the priority identifier is a second character, determine not to use the preset priority sequence.

Optionally, that the processing unit 101 is further configured to determine whether a priority of the uplink data is higher than a priority of the periodic BSR based on the priority of the logical channel to which the uplink data belongs and the priority of the logical channel to which the periodic BSR belongs includes the processing unit 101 is further configured to when the priority of the logical channel to which the uplink data belongs is higher than the priority of the logical channel to which the periodic BSR belongs, determine that the priority of the uplink data is higher than the priority of the periodic BSR, or the processing unit 101 is further configured to when the priority of the logical channel to which the uplink data belongs is lower than or equal to the priority of the logical channel to which the periodic BSR belongs, determine that the priority of the uplink data is lower than the priority of the periodic BSR.

In this embodiment of the present disclosure, when a priority of a logical channel to which uplink data that is being sent belongs is higher than a priority of a logical channel to which a periodic BSR belongs, it is determined that a priority of the uplink data that is being sent is higher than a priority of the periodic BSR. In this case, the uplink data is sent to a base station at a priority higher than the priority of the periodic BSR, thereby avoiding that the periodic BSR on the logical channel with a lower priority occupies more uplink resources, avoiding segmentation of the uplink data on the logical channel with a higher priority, and avoiding delayed sending of the uplink data on the logical channel with a higher priority.

Figure 3:
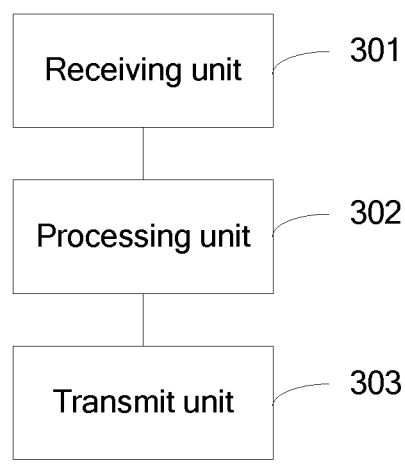
FIG. 3 is a schematic structural diagram of a second data transmission device according to an embodiment of the present disclosure.

FIG. 3 is a schematic structural diagram of a second data transmission device according to an embodiment of the present disclosure. Referring to FIG. 3, the device includes a receiving unit 301 configured to receive, in a process of transmitting uplink data corresponding to a first BSR by UE, a second BSR sent by the UE, a processing unit 302 configured to calculate an uplink data amount scheduled in a period between a first sending time and a second BSR receiving time, where the first sending time is a time at which an uplink grant is last sent to the UE before the second BSR is received, where the processing unit 302 is further configured to determine a to-be-scheduled uplink data amount according to an uplink data amount carried in the second BSR and the scheduled uplink data amount, and a transmit unit 303 configured to send an uplink grant to the UE based on the to-be-scheduled uplink data amount, where the uplink grant is used to instruct the UE to send to-be-scheduled uplink data to a base station.

Optionally, that the processing unit 302 is further configured to determine a to-be-scheduled uplink data amount according to an uplink data amount carried in the second BSR and the scheduled uplink data amount includes the processing unit 302 is further configured to calculate a difference between the uplink data amount carried in the second BSR and the scheduled uplink data amount, and the processing unit 302 is further configured to determine the calculated difference as the to-be-scheduled uplink data amount.

Optionally, that a transmit unit 303 is configured to send an uplink grant to the UE based on the to-be-scheduled uplink data amount, where the uplink grant is used to instruct the UE to send to-be-scheduled uplink data to a base station includes the processing unit 302 is further configured to generate multiple uplink grants based on the to-be-scheduled uplink data amount, the processing unit 302 is further configured to allocate an uplink grant identifier to each of the multiple uplink grants, to obtain multiple uplink grant identifiers, and the transmit unit 303 is further configured to send the multiple uplink grants and the multiple uplink grant identifiers to the UE such that the UE sends the to-be-scheduled uplink data to the base station.

Optionally, that the transmit unit 303 is further configured to send the multiple uplink grants and the multiple uplink grant identifiers to the UE such that the UE sends the to-be-scheduled uplink data to the base station includes the transmit unit 303 is further configured to for any uplink grant in the multiple uplink grants, send the uplink grant and an uplink grant identifier corresponding to the uplink grant to the UE such that the UE sends uplink data corresponding to the uplink grant and a first uplink grant identifier to the base station, where the first uplink grant identifier is an uplink grant identifier that is last received by the UE before the uplink grant is received, the processing unit 302 is further configured to obtain a second uplink grant identifier when the uplink data and the first uplink grant identifier that are sent by the UE are received, where the second uplink grant identifier is an uplink grant identifier that is last sent by the base station before the uplink grant is sent to the UE, the processing unit 302 is further configured to if the first uplink grant identifier and the second uplink grant identifier are the same, determine that a last uplink grant sent to the UE is not lost, and the transmit unit 303 is further configured to send a next uplink grant and an uplink grant identifier corresponding to the next uplink grant to the UE, where the last uplink grant is an uplink grant that is last sent to the UE before the uplink grant.

Optionally, the uplink grant identifier is an uplink grant sequence number or an uplink grant timestamp.

In this embodiment of the present disclosure, if receiving a second BSR sent by UE, a base station calculates an uplink data amount scheduled in a period between a first sending time and a second BSR receiving time, calculates a difference between an uplink data amount carried in the second BSR and the scheduled uplink data amount, and determines the calculated difference as a to-be-scheduled uplink data amount. The to-be-scheduled uplink data does not include uplink data corresponding to a first BSR, thereby avoiding redundancy of scheduled resources, and saving scheduled resources.

Figure 4:
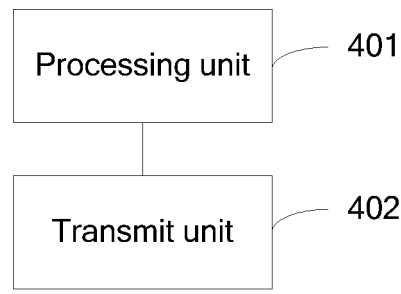
FIG. 4 is a schematic structural diagram of a third data transmission device according to an embodiment of the present disclosure.

FIG. 4 is a schematic structural diagram of a third data transmission device according to an embodiment of the present disclosure. Referring to FIG. 4, the device includes a processing unit 401 configured to when UE is connected to multiple base stations and receives a BSR triggering instruction, separately calculate offloading factors of the multiple base stations based on parameter information of the multiple base stations, where the parameter information includes channel quality, load on a base station, and a distance between the UE and a base station, where the processing unit 401 is further configured to separately multiply a total buffered uplink data amount by the offloading factors of the multiple base stations, to obtain uplink data amounts corresponding to the multiple base stations, and a transmit unit 402 configured to for each base station in the multiple base stations, send a corresponding BSR to the base station such that the base station sends an uplink grant to the UE, where the uplink grant is used to instruct the UE to send buffered uplink data to the base station, and the BSR carries an uplink data amount corresponding to the base station.

Optionally, that a processing unit 401 is configured to when UE is connected to multiple base stations and receives a BSR triggering instruction, separately calculate offloading factors of the multiple base stations based on parameter information of the multiple base stations includes the processing unit 401 is further configured to when the UE is connected to the multiple base stations and receives the BSR triggering instruction, separately calculate offloading parameters corresponding to the multiple base stations based on the parameter information of the multiple base stations, the processing unit 401 is further configured to for each base station in the multiple base stations, calculate a proportion of an offloading parameter corresponding to the base station in a total offloading parameter, where the total offloading parameter is a sum of the offloading parameters corresponding to the multiple base stations, and the processing unit 401 is further configured to determine the calculated proportion as an offloading factor of the base station.

In this embodiment of the present disclosure, parameter information of base stations is dynamic and changeable. Therefore, when a BSR triggering instruction is received, UE separately calculates offloading factors of the multiple base stations based on the parameter information of the multiple base stations dynamically to ensure accuracy of a calculated offloading factor, and ensure that the base station can allocate an uplink resource to the UE. A total buffered uplink data amount is separately multiplied by the offloading factors of the multiple base stations, to obtain uplink data amounts corresponding to the multiple base stations, and then corresponding BSRs are reported to the multiple base stations. In this way, it is ensured that buffered uplink data of the UE can be sent to the base stations, and a delay of sending the uplink data by the UE is reduced.

Figure 5:
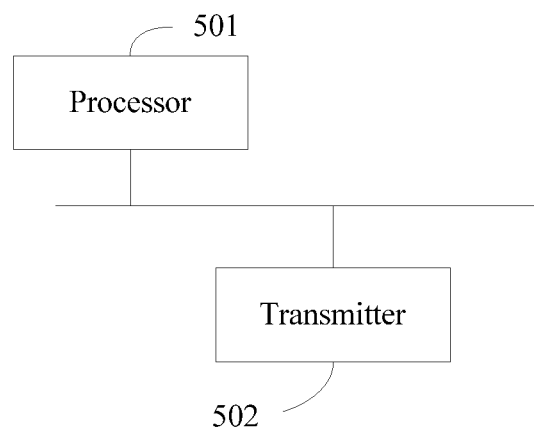
FIG. 5 is a schematic structural diagram of a fourth data transmission device according to an embodiment of the present disclosure.

FIG. 5 is a schematic structural diagram of a fourth data transmission device according to an embodiment of the present disclosure. Referring to FIG. 5, the device includes a processor 501 configured to when a triggering instruction for triggering a periodic BSR is received, obtain a priority of a logical channel to which uplink data that is being sent belongs, and obtain a priority of a logical channel to which the periodic BSR belongs, where the processor 501 is further configured to determine whether a priority of the uplink data is higher than a priority of the periodic BSR based on the priority of the logical channel to which the uplink data belongs and the priority of the logical channel to which the periodic BSR belongs, and a transmitter 502 configured to send the uplink data to a base station at a priority higher than the priority of the periodic BSR when the priority of the uplink data is higher than the priority of the periodic BSR, where the transmitter 502 is further configured to send the periodic BSR to the base station at a priority higher than the priority of the uplink data when the priority of the uplink data is lower than the priority of the periodic BSR.

Figure 6:
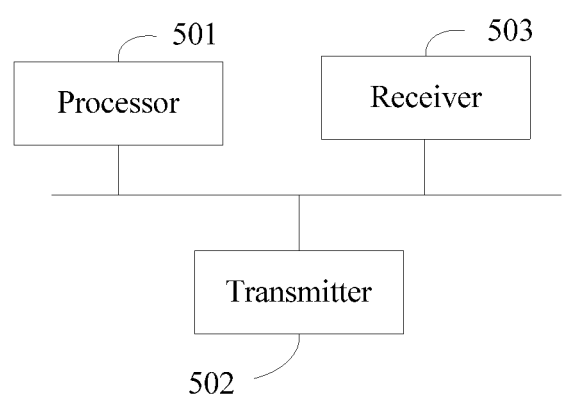
FIG. 6 is a schematic structural diagram of a fifth data transmission device according to an embodiment of the present disclosure.

Optionally, referring to FIG. 6, the device further includes a receiver 503 configured to receive configuration information sent by the base station, where the configuration information includes a preset priority sequence and a priority identifier, the preset priority sequence is used to indicate a priority sequence among multiple logical channels of UE and a priority sequence between uplink data and a periodic BSR on each logical channel.

The processor 501 is further configured to determine, based on the priority identifier, whether to use the preset priority sequence.

That a processor 501 is configured to obtain a priority of a logical channel to which uplink data that is being sent belongs, and obtain a priority of a logical channel to which the periodic BSR belongs includes the processor 501 is further configured to when determining to use the preset priority sequence, obtain the priority of the logical channel to which the uplink data that is being sent belongs, and obtain the priority of the logical channel to which the periodic BSR belongs.

Optionally, that the processor 501 is further configured to determine, based on the priority identifier, whether to use the preset priority sequence includes the processor 501 is further configured to when the priority identifier is a first character, determine to use the preset priority sequence, or the processor 501 is further configured to when the priority identifier is a second character, determine not to use the preset priority sequence.

Optionally, that the processor 501 is further configured to determine whether a priority of the uplink data is higher than a priority of the periodic BSR based on the priority of the logical channel to which the uplink data belongs and the priority of the logical channel to which the periodic BSR belongs includes the processor 501 is further configured to when the priority of the logical channel to which the uplink data belongs is higher than the priority of the logical channel to which the periodic BSR belongs, determine that the priority of the uplink data is higher than the priority of the periodic BSR, or the processor 501 is further configured to when the priority of the logical channel to which the uplink data belongs is lower than or equal to the priority of the logical channel to which the periodic BSR belongs, determine that the priority of the uplink data is lower than the priority of the periodic BSR.

In this embodiment of the present disclosure, when a priority of a logical channel to which uplink data that is being sent belongs is higher than a priority of a logical channel to which a periodic BSR belongs, it is determined that a priority of the uplink data that is being sent is higher than a priority of the periodic BSR. In this case, the uplink data is sent to a base station at a priority higher than the priority of the periodic BSR, thereby avoiding that the periodic BSR on the logical channel with a lower priority occupies more uplink resources, avoiding segmentation of the uplink data on the logical channel with a higher priority, and avoiding delayed sending of the uplink data on the logical channel with a higher priority.

Figure 7:
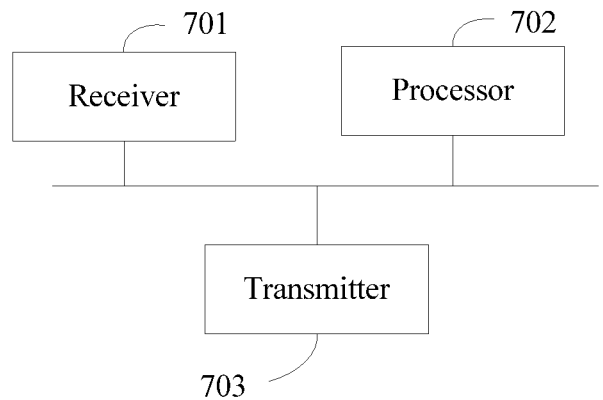
FIG. 7 is a schematic structural diagram of a sixth data transmission device according to an embodiment of the present disclosure.

FIG. 7 is a schematic structural diagram of a sixth data transmission device according to an embodiment of the present disclosure. Referring to FIG. 7, the device includes a receiver 701 configured to receive, in a process of transmitting uplink data corresponding to a first BSR by UE, a second BSR sent by the UE, a processor 702 configured to calculate an uplink data amount scheduled in a period between a first sending time and a second BSR receiving time, where the first sending time is a time at which an uplink grant is last sent to the UE before the second BSR is received, where the processor 702 is further configured to determine a to-be-scheduled uplink data amount according to an uplink data amount carried in the second BSR and the scheduled uplink data amount, and a transmitter 703 configured to send an uplink grant to the UE based on the to-be-scheduled uplink data amount, where the uplink grant is used to instruct the UE to send to-be-scheduled uplink data to a base station.

Optionally, that the processor 702 is further configured to determine a to-be-scheduled uplink data amount according to an uplink data amount carried in the second BSR and the scheduled uplink data amount includes the processor 702 is further configured to calculate a difference between the uplink data amount carried in the second BSR and the scheduled uplink data amount, and the processor 702 is further configured to determine the calculated difference as the to-be-scheduled uplink data amount.

Optionally, that a transmitter is configured to send an uplink grant to the UE based on the to-be-scheduled uplink data amount, where the uplink grant is used to instruct the UE to send to-be-scheduled uplink data to a base station includes the processor 702 is further configured to generate multiple uplink grants based on the to-be-scheduled uplink data amount, the processor 702 is further configured to allocate an uplink grant identifier to each of the multiple uplink grants, to obtain multiple uplink grant identifiers, and the transmitter 703 is further configured to send the multiple uplink grants and the multiple uplink grant identifiers to the UE such that the UE sends the to-be-scheduled uplink data to the base station.

Optionally, that the transmitter 703 is further configured to send the multiple uplink grants and the multiple uplink grant identifiers to the UE such that the UE sends the to-be-scheduled uplink data to the base station includes the transmitter 703 is further configured to for any uplink grant in the multiple uplink grants, send the uplink grant and an uplink grant identifier corresponding to the uplink grant to the UE such that the UE sends uplink data corresponding to the uplink grant and a first uplink grant identifier to the base station, where the first uplink grant identifier is an uplink grant identifier that is last received by the UE before the uplink grant is received, the processor 702 is further configured to obtain a second uplink grant identifier when the uplink data and the first uplink grant identifier that are sent by the UE are received, where the second uplink grant identifier is an uplink grant identifier that is last sent by the base station before the uplink grant is sent to the UE, the processor 702 is further configured to if the first uplink grant identifier and the second uplink grant identifier are the same, determine that a last uplink grant sent to the UE is not lost, and the transmitter 703 is further configured to send a next uplink grant and an uplink grant identifier corresponding to the next uplink grant to the UE, where the last uplink grant is an uplink grant that is last sent to the UE before the uplink grant.

Optionally, the uplink grant identifier is an uplink grant sequence number or an uplink grant timestamp.

In this embodiment of the present disclosure, if receiving a second BSR sent by UE, a base station calculates an uplink data amount scheduled in a period between a first sending time and a second BSR receiving time, calculates a difference between an uplink data amount carried in the second BSR and the scheduled uplink data amount, and determines the calculated difference as a to-be-scheduled uplink data amount. The to-be-scheduled uplink data does not include uplink data corresponding to a first BSR, thereby avoiding redundancy of scheduled resources, and saving scheduled resources.

Figure 8:
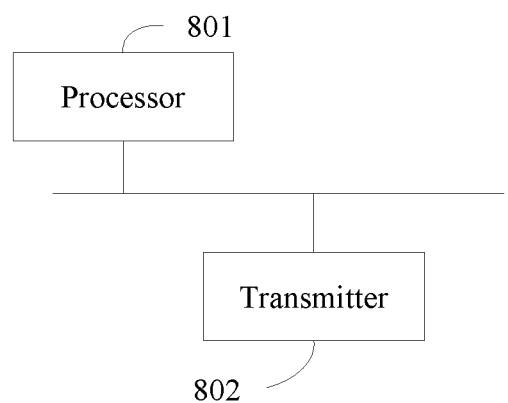
FIG. 8 is a schematic structural diagram of an seventh data transmission device according to an embodiment of the present disclosure.

FIG. 8 is a schematic structural diagram of a seventh data transmission device according to an embodiment of the present disclosure. Referring to FIG. 8, the device includes a processor 801 configured to when UE is connected to multiple base stations and receives a BSR triggering instruction, separately calculate offloading factors of the multiple base stations based on parameter information of the multiple base stations, where the parameter information includes channel quality, load on a base station, and a distance between the UE and a base station, where the processor 801 is further configured to separately multiply a total buffered uplink data amount by the offloading factors of the multiple base stations, to obtain uplink data amounts corresponding to the multiple base stations, and a transmitter 802 configured to for each base station in the multiple base stations, send a corresponding BSR to the base station such that the base station sends an uplink grant to the UE, where the uplink grant is used to instruct the UE to send buffered uplink data to the base station, and the BSR carries an uplink data amount corresponding to the base station.

Optionally, that a processor 801 is configured to when UE is connected to multiple base stations and receives a BSR triggering instruction, separately calculate offloading factors of the multiple base stations based on parameter information of the multiple base stations includes the processor 801 is further configured to separately calculate offloading parameters corresponding to the multiple base stations based on the parameter information of the multiple base stations, the processor 801 is further configured to for each base station in the multiple base stations, calculate a proportion of an offloading parameter corresponding to the base station in a total offloading parameter, where the total offloading parameter is a sum of the offloading parameters corresponding to the multiple base stations, and the processor 801 is further configured to determine the calculated proportion as an offloading factor of the base station.

In this embodiment of the present disclosure, parameter information of base stations is dynamic and changeable. Therefore, when a BSR triggering instruction is received, UE separately calculates offloading factors of the multiple base stations based on the parameter information of the multiple base stations dynamically to ensure accuracy of a calculated offloading factor, and ensure that the base station can allocate an uplink resource to the UE. A total buffered uplink data amount is separately multiplied by the offloading factors of the multiple base stations, to obtain uplink data amounts corresponding to the multiple base stations, and then corresponding BSRs are reported to the multiple base stations. In this way, it is ensured that buffered uplink data of the UE can be sent to the base stations, and a delay of sending the uplink data by the UE is reduced.

Figure 9:
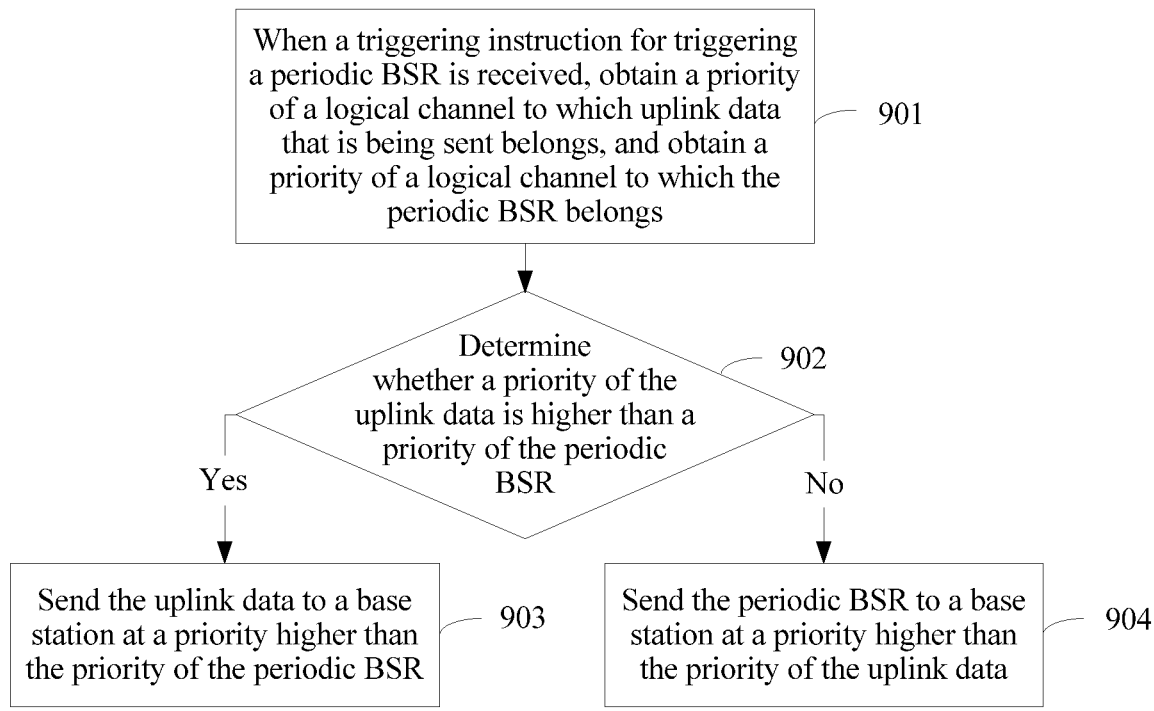
FIG. 9 is a flowchart of a first data transmission method according to an embodiment of the present disclosure.

FIG. 9 is a flowchart of a first data transmission method according to an embodiment of the present disclosure. The method may be executed by UE. Referring to FIG. 9, the method includes the following steps.

Step 901: When a triggering instruction for triggering a periodic BSR is received, obtain a priority of a logical channel to which uplink data that is being sent belongs, and obtain a priority of a logical channel to which the periodic BSR belongs.

Step 902: Determine whether a priority of the uplink data is higher than a priority of the periodic BSR based on the priority of the logical channel to which the uplink data belongs and the priority of the logical channel to which the periodic BSR belongs.

Step 903: Send the uplink data to a base station at a priority higher than the priority of the periodic BSR when the priority of the uplink data is higher than the priority of the periodic BSR.

Step 904: Send the periodic BSR to a base station at a priority higher than the priority of the uplink data when the priority of the uplink data is lower than the priority of the periodic BSR.

In this embodiment of the present disclosure, when a priority of a logical channel to which uplink data that is being sent belongs is higher than a priority of a logical channel to which a periodic BSR belongs, it is determined that a priority of the uplink data that is being sent is higher than a priority of the periodic BSR. In this case, the uplink data is sent to a base station at a priority higher than the priority of the periodic BSR, thereby avoiding that the periodic BSR on the logical channel with a lower priority occupies more uplink resources, avoiding segmentation of the uplink data on the logical channel with a higher priority, and avoiding delayed sending of the uplink data on the logical channel with a higher priority.

Optionally, before the obtaining a priority of a logical channel to which uplink data that is being sent belongs, and obtaining a priority of a logical channel to which the periodic BSR belongs, the method further includes receiving configuration information sent by the base station, where the configuration information includes a preset priority sequence and a priority identifier, the preset priority sequence is used to indicate a priority sequence among multiple logical channels of the UE and a priority sequence between uplink data and a periodic BSR on each logical channel, and determining, based on the priority identifier, whether to use the preset priority sequence.

The obtaining a priority of a logical channel to which uplink data that is being sent belongs, and obtaining a priority of a logical channel to which the periodic BSR belongs includes when determining to use the preset priority sequence, obtaining the priority of the logical channel to which the uplink data that is being sent belongs, and obtaining the priority of the logical channel to which the periodic BSR belongs.

Optionally, the determining, based on the priority identifier, whether to use the preset priority sequence includes when the priority identifier is a first character, determining to use the preset priority sequence, or when the priority identifier is a second character, determining not to use the preset priority sequence.

Optionally, the determining whether a priority of the uplink data is higher than a priority of the periodic BSR based on the priority of the logical channel to which the uplink data belongs and the priority of the logical channel to which the periodic BSR belongs includes when the priority of the logical channel to which the uplink data belongs is higher than the priority of the logical channel to which the periodic BSR belongs, determining that the priority of the uplink data is higher than the priority of the periodic BSR, or when the priority of the logical channel to which the uplink data belongs is lower than or equal to the priority of the logical channel to which the periodic BSR belongs, determining that the priority of the uplink data is lower than the priority of the periodic BSR.

All the foregoing optional technical solutions may be randomly combined to form an optional embodiment of the present disclosure, and details are not described in this embodiment of the present disclosure.

Figure 10:
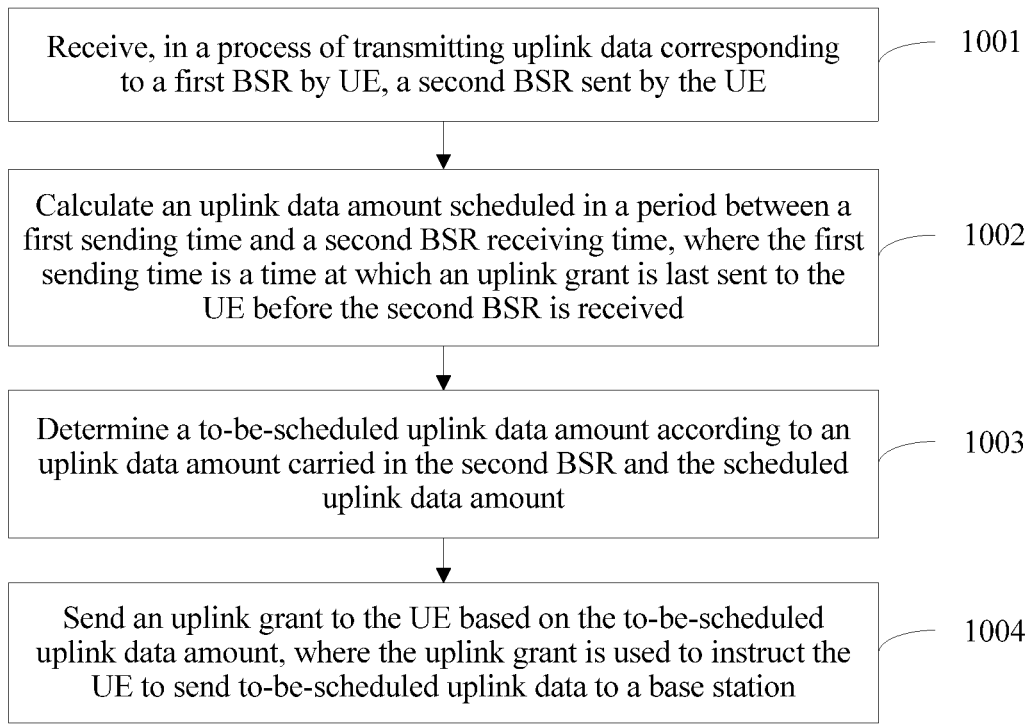
FIG. 10 is a flowchart of a second data transmission method according to an embodiment of the present disclosure.

FIG. 10 is a flowchart of a second data transmission method according to an embodiment of the present disclosure. The method may be executed by a base station. Referring to FIG. 10, the method includes the following steps.

Step 1001: Receive, in a process of transmitting uplink data corresponding to a first BSR by UE, a second BSR sent by the UE.

Step 1002: Calculate an uplink data amount scheduled in a period between a first sending time and a second BSR receiving time, where the first sending time is a time at which an uplink grant is last sent to the UE before the second BSR is received.

Step 1003: Determine a to-be-scheduled uplink data amount according to an uplink data amount carried in the second BSR and the scheduled uplink data amount.

Step 1004: Send an uplink grant to the UE based on the to-be-scheduled uplink data amount, where the uplink grant is used to instruct the UE to send to-be-scheduled uplink data to the base station.

In this embodiment of the present disclosure, if receiving a second BSR sent by UE, a base station calculates an uplink data amount scheduled in a period between a first sending time and a second BSR receiving time, calculates a difference between an uplink data amount carried in the second BSR and the scheduled uplink data amount, and determines the calculated difference as a to-be-scheduled uplink data amount. The to-be-scheduled uplink data does not include uplink data corresponding to a first BSR, thereby avoiding redundancy of scheduled resources, and saving scheduled resources.

Optionally, the determining a to-be-scheduled uplink data amount according to an uplink data amount carried in the second BSR and the scheduled uplink data amount includes calculating a difference between the uplink data amount carried in the second BSR and the scheduled uplink data amount, and determining the calculated difference as the to-be-scheduled uplink data amount.

Optionally, the sending an uplink grant to the UE based on the to-be-scheduled uplink data amount, where the uplink grant is used to instruct the UE to send to-be-scheduled uplink data to the base station includes generating multiple uplink grants based on the to-be-scheduled uplink data amount, allocating an uplink grant identifier to each of the multiple uplink grants, to obtain multiple uplink grant identifiers, and sending the multiple uplink grants and the multiple uplink grant identifiers to the UE such that the UE sends the to-be-scheduled uplink data to the base station.

Optionally, the sending the multiple uplink grants and the multiple uplink grant identifiers to the UE such that the UE sends the to-be-scheduled uplink data to the base station includes for any uplink grant in the multiple uplink grants, sending the uplink grant and an uplink grant identifier corresponding to the uplink grant to the UE such that the UE sends uplink data corresponding to the uplink grant and a first uplink grant identifier to the base station, where the first uplink grant identifier is an uplink grant identifier that is last received by the UE before the uplink grant is received, obtaining a second uplink grant identifier when the uplink data and the first uplink grant identifier that are sent by the UE are received, where the second uplink grant identifier is an uplink grant identifier that is last sent by the base station before the uplink grant is sent to the UE, if the first uplink grant identifier and the second uplink grant identifier are the same, determining that a last uplink grant sent to the UE is not lost, and sending a next uplink grant and an uplink grant identifier corresponding to the next uplink grant to the UE, where the last uplink grant is an uplink grant that is last sent to the UE before the uplink grant.

Optionally, the uplink grant identifier is an uplink grant sequence number or an uplink grant timestamp.

All the foregoing optional technical solutions may be randomly combined to form an optional embodiment of the present disclosure, and details are not described in this embodiment of the present disclosure.

Figure 11:
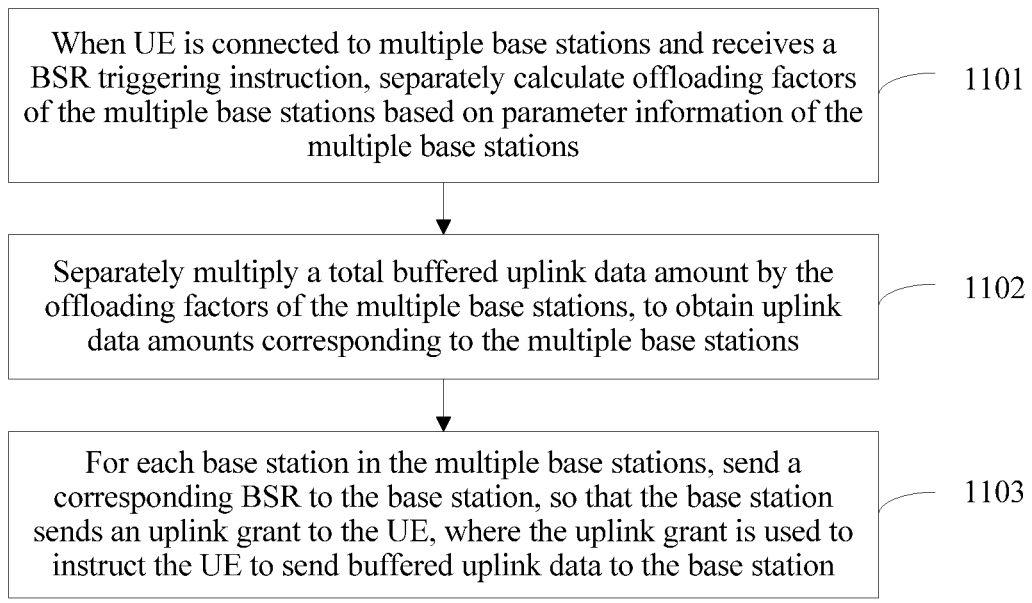
FIG. 11 is a flowchart of a third data transmission method according to an embodiment of the present disclosure.

FIG. 11 is a flowchart of a third data transmission method according to an embodiment of the present disclosure. Referring to FIG. 11, the method includes the following steps.

Step 1101: When UE is connected to multiple base stations and receives a BSR triggering instruction, separately calculate offloading factors of the multiple base stations based on parameter information of the multiple base stations, where the parameter information includes channel quality, load on a base station, and a distance between the UE and a base station.

Step 1102: Separately multiply a total buffered uplink data amount by the offloading factors of the multiple base stations, to obtain uplink data amounts corresponding to the multiple base stations.

Step 1103: For each base station in the multiple base stations, send a corresponding BSR to the base station such that the base station sends an uplink grant to the UE, where the uplink grant is used to instruct the UE to send buffered uplink data to the base station, and the BSR carries an uplink data amount corresponding to the base station.

Optionally, the separately calculating offloading factors of the multiple base stations based on parameter information of the multiple base stations includes separately calculating offloading parameters corresponding to the multiple base stations based on the parameter information of the multiple base stations, for each base station in the multiple base stations, calculating a proportion of an offloading parameter corresponding to the base station in a total offloading parameter, where the total offloading parameter is a sum of the offloading parameters corresponding to the multiple base stations, and determining the calculated proportion as an offloading factor of the base station.

In this embodiment of the present disclosure, parameter information of base stations is dynamic and changeable. Therefore, when a BSR triggering instruction is received, UE separately calculates offloading factors of the multiple base stations based on the parameter information of the multiple base stations dynamically to ensure accuracy of a calculated offloading factor, and ensure that the base station can allocate an uplink resource to the UE. A total buffered uplink data amount is separately multiplied by the offloading factors of the multiple base stations, to obtain uplink data amounts corresponding to the multiple base stations, and then corresponding BSRs are reported to the multiple base stations. In this way, it is ensured that buffered uplink data of the UE can be sent to the base stations, and a delay of sending the uplink data by the UE is reduced.

Figure 12:
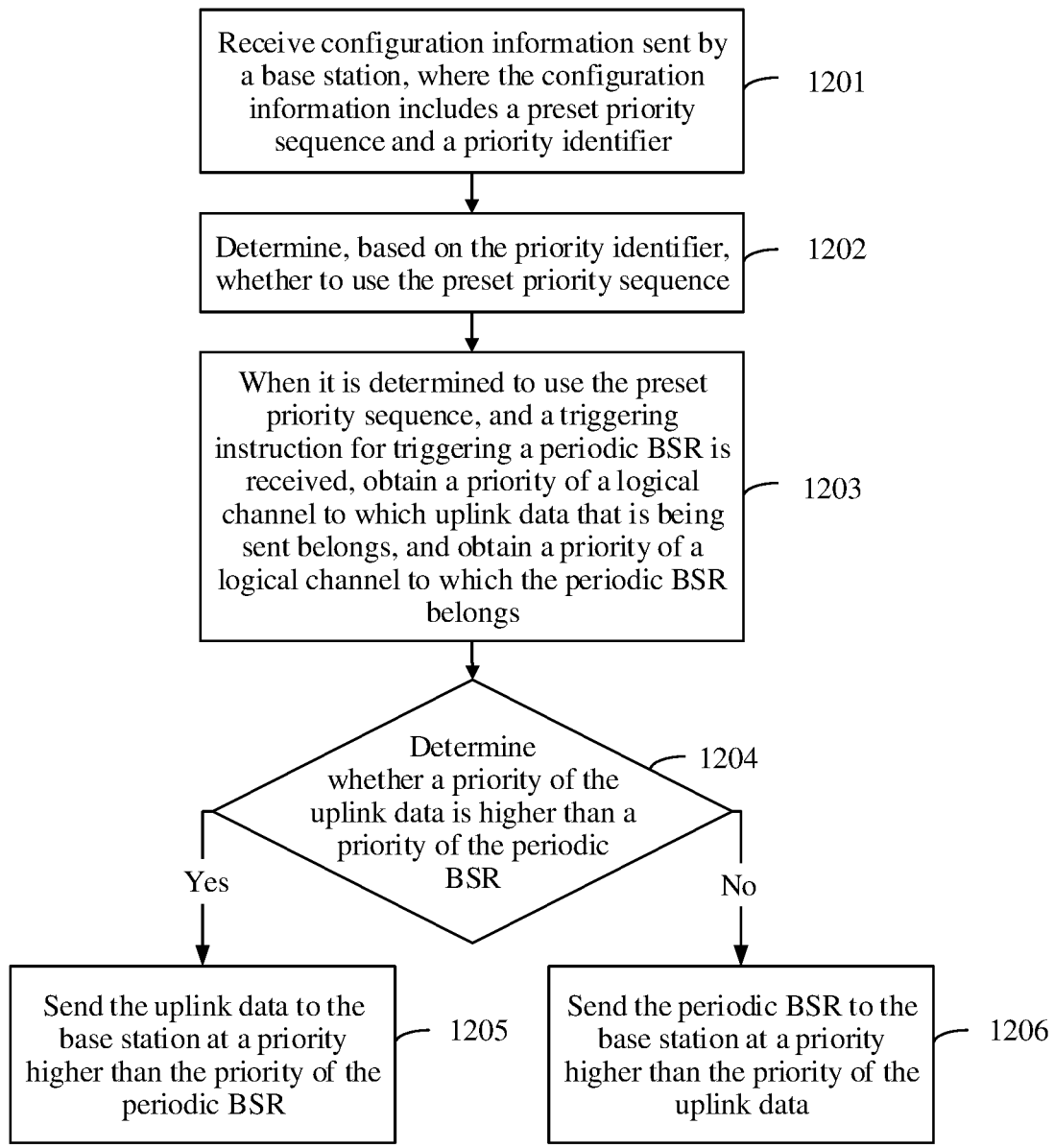
FIG. 12 is a flowchart of a fourth data transmission method according to an embodiment of the present disclosure.

A periodic BSR is sent to a base station at a priority higher than a priority of a logical channel to which uplink data belongs. When a priority of a logical channel to which uplink data that is being sent belongs is higher than a priority of the periodic BSR, the uplink data on the logical channel with a higher priority is segmented, and sending of the uplink data on the logical channel with a higher priority is delayed. Therefore, an embodiment of the present disclosure provides a data transmission method, to avoid segmentation of the uplink data on the logical channel with a higher priority, and avoid delayed sending of the uplink data on the logical channel with a higher priority. FIG. 12 is a flowchart of a fourth data transmission method according to this embodiment of the present disclosure. The method may be executed by UE. Referring to FIG. 12, the method includes the following steps:

Step 1201: Receive configuration information sent by a base station, where the configuration information includes a preset priority sequence and a priority identifier, the preset priority sequence is used to indicate a priority sequence among multiple logical channels of UE and a priority sequence between uplink data and a periodic BSR on each logical channel.

For different base stations, priority sequences between the multiple logical channels may be different. Therefore, each time the UE is connected to a base station, the base station needs to configure the priority sequence among the multiple logical channels of the UE. Then, the UE may send uplink data to the base station according to the configured priority sequence. That is, the base station may send the configuration information to the UE when the UE is connected to the base station. The configuration information includes the preset priority sequence and the priority identifier. The preset priority sequence is used to indicate the priority sequence among the multiple logical channels of the UE and the priority sequence between the uplink data and the periodic BSR on each logical channel.

It should be noted that in this embodiment of the present disclosure, the UE may have multiple logical channels. Each logical channel is corresponding to a priority, and respective uplink data may be buffered on each logical channel. In addition, each logical channel is further corresponding to a periodic BSR. The periodic BSR for each logical channel may report, to the base station, an uplink data amount of the logical channel to which the periodic BSR belongs. For example, the UE has three logical channels, which are respectively a logical channel 1, a logical channel 2, and a logical channel 3. The logical channel 1 corresponds to a periodic BSR, the logical channel 2 corresponds to a periodic BSR, and the logical channel 3 also corresponds to a periodic BSR. The periodic BSR corresponding to the logical channel 1 may report an amount of uplink data buffered on the logical channel 1 to the base station. The periodic BSR corresponding to the logical channel 2 may report an amount of uplink data buffered on the logical channel 2 to the base station. The periodic BSR corresponding to the logical channel 3 may report an amount of uplink data buffered on the logical channel 3 to the base station.

The preset priority sequence included in the configuration information is used to indicate the priority sequence among the multiple logical channels of the UE and the priority sequence between the uplink data and the periodic BSR on each logical channel. However, in this embodiment of the present disclosure, on a same logical channel, a priority of a periodic BSR may be higher than a priority of uplink data to avoid that a periodic BSR with a lower priority occupies more uplink resources. For example, the configuration information indicates that a priority of the logical channel 1 is higher than a priority of the logical channel 2, the priority of the logical channel 2 is higher than a priority of the logical channel 3, a priority of the periodic BSR for the logical channel 1 is higher than a priority of the uplink data on the logical channel 1, a priority of the periodic BSR for the logical channel 2 is higher than a priority of the uplink data on the logical channel 2, and a priority of the periodic BSR for the logical channel 3 is higher than a priority of the uplink data on the logical channel 3. This may be represented using a priority relationship shown in the following formula (1)

$$BSR1 > Data1 > BSR2 > Data2 > BSR3 > Data3 \qquad (1)$$

In the foregoing formula (1), BSR1 is the priority of the periodic BSR corresponding to the logical channel 1, and Data1 is the priority of the uplink data corresponding to the logical channel 1, BSR2 is the priority of the periodic BSR corresponding to the logical channel 2, and Data2 is the priority of the uplink data corresponding to the logical channel 2, and BSR3 is the priority of the periodic BSR corresponding to the logical channel 3, and Data3 is the priority of the uplink data corresponding to the logical channel 3.

In addition, the priority identifier in the configuration information is used to instruct the UE whether to use the preset priority sequence. The priority identifier may be represented by a numerical value, a letter, or the like. This is not limited in this embodiment of the present disclosure.

Step 1202: Determine, based on the priority identifier, whether to use the preset priority sequence.

In an embodiment, when the priority identifier is a first character, it is determined to use the preset priority sequence, or when the priority identifier is a second character, it is determined not to use the preset priority sequence. For example, the first character is "true", and the second character is "false". When the priority identifier is "true", it is determined to use the preset priority sequence, or when the priority identifier is "false", it is determined not to use the preset priority sequence.

The base station configures the priority sequence among the multiple logical channels of the UE for the UE when the UE is connected to the base station. If the base station sets the priority identifier to the second character at a current time, when the configuration information that carries the priority identifier is received, the UE determines not to use the preset priority sequence. In a data transmission process, when the base station instructs the UE to use the preset priority sequence, the base station only needs to send instruction information to the UE without a need to send the configuration information to the UE again. The instruction information is used to instruct the UE to transmit data to the base station based on the preset priority sequence, that is, to use the preset priority sequence.

Step 1203: When it is determined to use the preset priority sequence, and a triggering instruction for triggering a periodic BSR is received, obtain a priority of a logical channel to which uplink data that is being sent belongs, and obtain a priority of a logical channel to which the periodic BSR belongs.

A triggering condition of the periodic BSR is based on a timer of the periodic BSR. If the timer of the periodic BSR expires, the UE receives the triggering instruction for triggering the periodic BSR. In this case, to avoid segmentation of uplink data on a logical channel with a higher priority, the priority of the logical channel to which the uplink data that is being sent belongs and the priority of the logical channel to which the periodic BSR belongs need to be obtained, and then it is determined, according to the priority of the logical channel to which the uplink data belongs and the priority of the logical channel to which the periodic BSR belongs, whether the periodic BSR is sent after the whole uplink data is sent or the uplink data continues to be sent after the periodic BSR is sent to the base station.

In addition, when the triggering instruction for triggering the periodic BSR is received, the UE may obtain an amount of uplink data buffered on a logical channel to which the periodic BSR belongs, and add the obtained uplink data amount to the periodic BSR when reporting the periodic BSR to the base station.

Step 1204: Determine whether a priority of the uplink data is higher than a priority of the periodic BSR based on the priority of the logical channel to which the uplink data belongs and the priority of the logical channel to which the periodic BSR belongs, and if the priority of the uplink data is higher than the priority of the periodic BSR, step 1205 is performed, or if the priority of the uplink data is not higher than the priority of the periodic BSR, step 1206 is performed.

In an embodiment, the priority of the logical channel to which the uplink data belongs is compared with the priority of the logical channel to which the periodic BSR belongs based on the preset priority sequence. When the priority of the logical channel to which the uplink data belongs is higher than the priority of the logical channel to which the periodic BSR belongs, it is determined that the uplink data and the periodic BSR belong to different logical channels, and it is determined that the priority of the uplink data is higher than the priority of the periodic BSR. When the priority of the logical channel to which the uplink data belongs is equal to the priority of the logical channel to which the periodic BSR belongs, it is determined that the uplink data and the periodic BSR belong to a same logical channel, and it is determined that the priority of the uplink data is lower than the priority of the periodic BSR. When the priority of the logical channel to which the uplink data belongs is lower than the priority of the logical channel to which the periodic BSR belongs, it is determined that the uplink data and the periodic BSR belong to different logical channels, and it is determined that the priority of the uplink data is lower than the priority of the periodic BSR.

Step 1205: Send the uplink data to the base station at a priority higher than the priority of the periodic BSR.

When the priority of the uplink data is higher than the priority of the periodic BSR, to avoid segmentation of the uplink data on the logical channel with a higher priority, the periodic BSR needs to be sent to the base station after the whole uplink data is sent, thereby avoiding that a periodic BSR corresponding to a logical channel with a lower priority occupies more uplink resources, and avoiding delayed sending of the uplink data on the logical channel with a higher priority.

Step 1206: Send the periodic BSR to the base station at a priority higher than the priority of the uplink data.

When the priority of the uplink data is lower than the priority of the periodic BSR, to ensure that the base station learns the amount of buffered uplink data on the logical channel in a timely manner, the uplink data needs to continue to be sent to the base station after the periodic BSR is sent to the base station, thereby ensuring that the base station schedules uplink data on the logical channel in a timely manner.

It should be noted that in this embodiment of the present disclosure, the periodic BSR and the uplink data are sent to the base station based on priorities. However, if uplink resources of the UE are relatively large and can carry both the uplink data and the periodic BSR, in this case, the periodic BSR and the uplink data may be multiplexed, and data obtained after the multiplexing is sent to the base station. A priority sequence between the periodic BSR and the uplink data may not be considered when the periodic BSR and the uplink data are being multiplexed. However, when the data obtained after the multiplexing is being sent to the base station, the data obtained after the multiplexing needs to be sent to the base station based on the priority sequence between the periodic BSR and the uplink data.

In this embodiment of the present disclosure, when a priority of a logical channel to which uplink data that is being sent belongs is higher than a priority of a logical channel to which a periodic BSR belongs, it is determined that a priority of the uplink data that is being sent is higher than a priority of the periodic BSR. In this case, the uplink data is sent to a base station at a priority higher than the priority of the periodic BSR, thereby avoiding that the periodic BSR on the logical channel with a lower priority occupies more uplink resources, avoiding segmentation of the uplink data on the logical channel with a higher priority, and avoiding delayed sending of the uplink data on the logical channel with a higher priority. Alternatively, when a priority of a logical channel to which uplink data belongs is lower than or equal to a priority of a logical channel to which a periodic BSR belongs, it is determined that a priority of the uplink data that is being sent is lower than a priority of the periodic BSR. In this case, the periodic BSR is sent to a base station at a priority higher than the priority of the uplink data, thereby ensuring that the periodic BSR with a higher priority can reach the base station in a timely manner such that the base station can schedule buffered uplink data on the logical channel in a timely manner.

Figure 13:
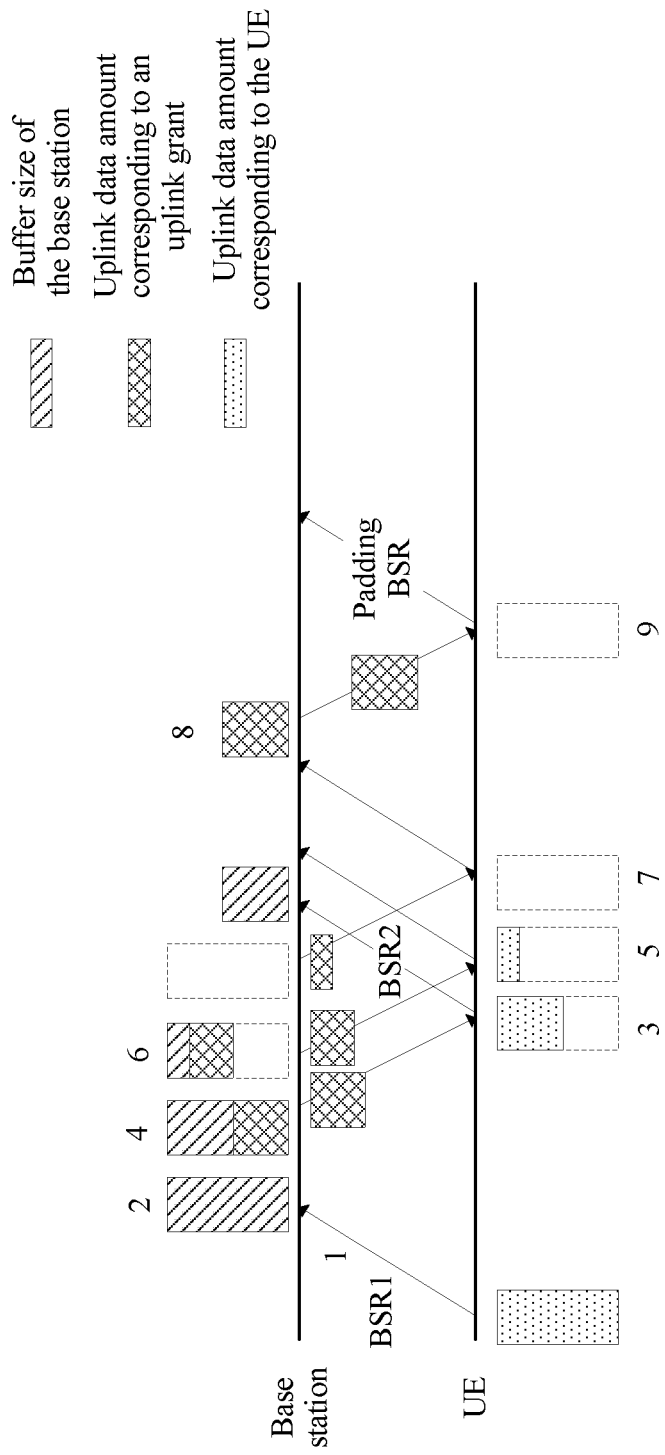
FIG. 13 is a schematic diagram of a data transmission architecture according to an embodiment of the present disclosure.
Figure 14:
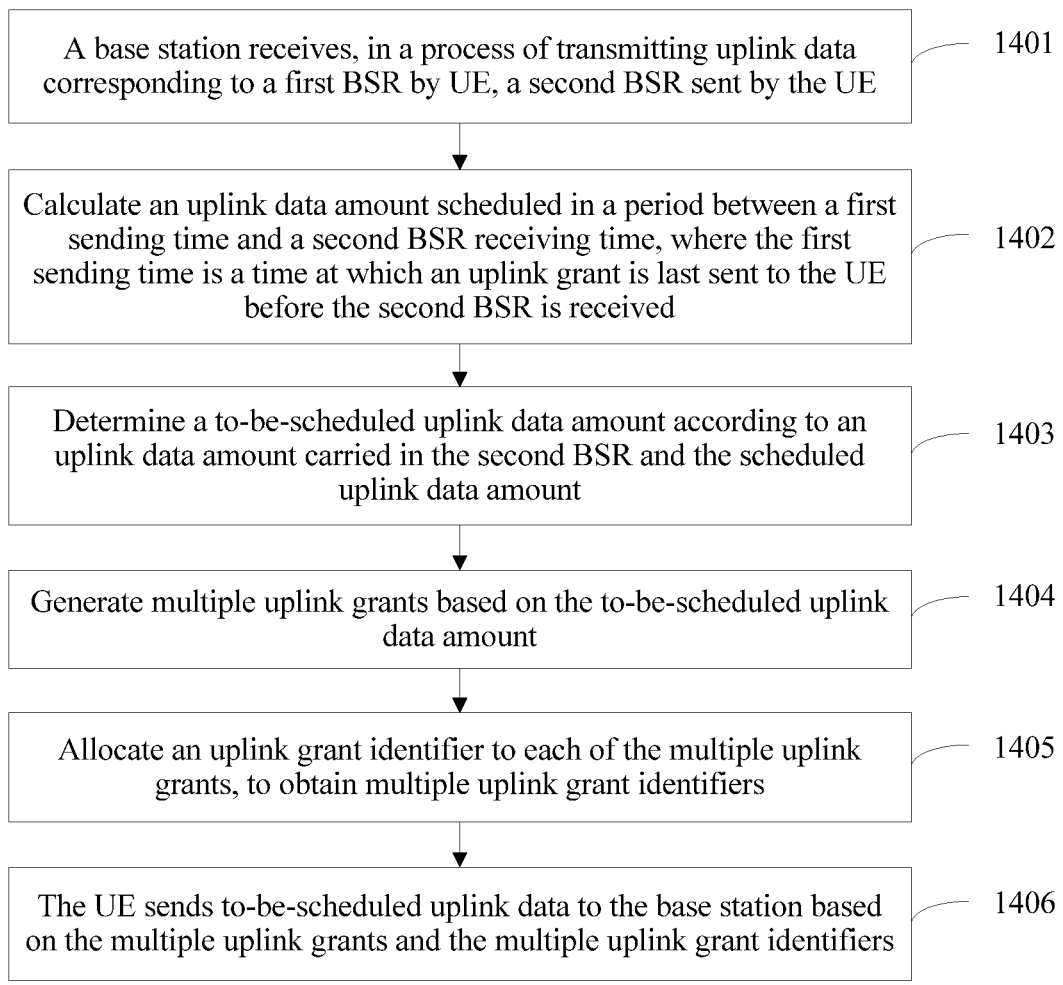
FIG. 14 is a flowchart of a fifth data transmission method according to an embodiment of the present disclosure.

When a base station receives a first BSR sent by UE, if an uplink data amount carried in the first BSR is relatively large, and the base station cannot schedule the whole uplink data at a time, the base station may generate multiple uplink grants based on the uplink data amount, and separately send the multiple uplink grants to the UE. When any uplink grant in the multiple uplink grants is received, the UE sends uplink data corresponding to the uplink grant to the base station. Before the base station sends all the multiple uplink grants to the UE, if the base station receives a second BSR sent by the UE, the UE obtains a buffered uplink data amount, adds the obtained uplink data amount to the second BSR, and sends the second BSR to the base station. Then, the base station continues to send, to the UE, an uplink grant that has not been sent such that the UE sends the whole uplink data corresponding to the first BSR to the base station. Because the uplink data amount carried in the second BSR includes an uplink data amount corresponding to the uplink grant that has not been sent, the uplink data corresponding to the first BSR and uplink data corresponding to the second BSR overlap. Therefore, redundancy of scheduled resources is caused when the base station schedules overlapped uplink data according to the second BSR. For example, as shown in FIG. 13, the UE sends a BSR1 to the base station in step 1. The base station separately schedules uplink data corresponding to the BSR1 in step 2, step 4, and step 6. If the UE further sends, in step 3, a BSR2 to the base station when sending uplink data that is scheduled in step 2 to the base station, and the UE has not received uplink grants in step 4 and step 6 when sending the BSR, in this case, an uplink data amount carried in the BSR2 is an amount of uplink data that needs to be scheduled in step 4 and step 6. Therefore, after scheduling the whole uplink data in step 4 and step 6, the base station further schedules uplink data corresponding to the BSR2 in step 8. In this case, there is actually no uplink data on a UE side, and the UE sends a padding BSR to the base station, thereby causing redundancy of scheduled resources. Therefore, an embodiment of the present disclosure provides a data transmission method to avoid the redundancy of scheduled resources. FIG. 14 is a flowchart of a fifth data transmission method according to an embodiment of the present disclosure. Referring to FIG. 14, the method includes the following steps.

Step 1401: A base station receives, in a process of transmitting uplink data corresponding to a first BSR by UE, a second BSR sent by the UE.

When the base station receives the first BSR sent by the UE, and an uplink data amount carried in the first BSR is relatively large, the base station needs to perform multiple times of scheduling. If the UE receives a triggering instruction for the second BSR in a process of the multiple times of scheduling, the UE obtains a buffered uplink data amount, adds the obtained uplink data amount to the second BSR, and sends the second BSR to the base station. That is, before completing the multiple times of scheduling, the base station receives the second BSR sent by the UE, and the uplink data amount carried in the second BSR includes a scheduled uplink data amount corresponding to the first BSR.

Step 1402: Calculate an uplink data amount scheduled in a period between a first sending time and a second BSR receiving time, where the first sending time is a time at which an uplink grant is last sent to the UE before the second BSR is received.

Because uplink data corresponding to the first BSR has not been completely scheduled when the base station receives the second BSR, a part of the uplink data amount carried in the second BSR may have been reported to the base station using the first BSR. Therefore, the uplink data amount scheduled in the period between the first sending time and the second BSR receiving time needs to be calculated, to ensure that redundancy of scheduled resources does not occur when uplink data corresponding to the second BSR is being scheduled.

A specific operation of calculating the uplink data amount scheduled in the period between the first sending time and the second BSR receiving time may be adding uplink data amounts corresponding to uplink grants that have not been sent by the base station to the UE in the period between the first sending time and the second BSR receiving time, to obtain the uplink data amount scheduled in the period between the first sending time and the second BSR receiving time, or obtaining an uplink data amount of uplink data corresponding to the first BSR that is sent by the UE and received before the first sending time, calculating a difference between the uplink data amount carried in the first BSR and the obtained uplink data amount, and determining the calculated difference as the uplink data amount scheduled in the period between the first sending time and the second BSR receiving time.

The first BSR and the second BSR each may be a regular BSR, a periodic BSR, or a padding BSR. Neither a type of the first BSR nor a type of the second BSR is limited in this embodiment of the present disclosure.

Step 1403: Determine a to-be-scheduled uplink data amount according to an uplink data amount carried in the second BSR and the scheduled uplink data amount.

In an embodiment, a difference between the uplink data amount carried in the second BSR and the scheduled uplink data amount is calculated, and the calculated difference is determined as the to-be-scheduled uplink data amount.

Step 1404: Generate multiple uplink grants based on the to-be-scheduled uplink data amount.

When the base station generates the multiple uplink grants based on the to-be-scheduled uplink data amount, a quantity of the uplink grants may be determined based on a condition such as a UE location (for example, whether the UE is on a coverage edge of the base station, or the like), or an uplink resource of the base station. This is not limited in this embodiment of the present disclosure.

Step 1405: Allocate an uplink grant identifier to each of the multiple uplink grants, to obtain multiple uplink grant identifiers.

The base station may send the multiple uplink grants to the UE after the base station generates the multiple uplink grants based on the to-be-scheduled uplink data amount. If channel quality is not stable in a process of sending an uplink grant by the base station, the uplink grant sent by the base station may be lost. Therefore, the UE may not receive the uplink grant sent by the base station. In this case, the UE does not send uplink data to the base station, and after a specified time period, the base station can learn that the uplink grant is lost, thereby causing a relatively large delay of sending uplink data by the UE. Therefore, in this embodiment of the present disclosure, the base station may allocate an uplink grant identifier to each of the generated multiple uplink grants. The base station may determine as soon as possible, using the uplink grant identifier, whether a sent uplink grant is lost, thereby reducing the delay of sending the uplink data by the UE.

It should be noted that the uplink grant identifier is an uplink grant sequence number or an uplink grant timestamp. When the uplink grant identifier is an uplink grant sequence number, the base station may number the generated uplink grants starting from 0. Preferably, there may be a maximum sequence number in uplink grant sequence numbers. When numbering for the uplink grants reaches the maximum sequence number, the numbering may be restarted from 0. This is not limited in this embodiment of the present disclosure. When the uplink grant identifier is an uplink grant timestamp, the uplink grant timestamp may be an uplink grant sending time. This is not limited in this embodiment of the present disclosure either.

Step 1406: The UE sends to-be-scheduled uplink data to the base station based on the multiple uplink grants and the multiple uplink grant identifiers.

In an embodiment, for any uplink grant in the multiple uplink grants, the uplink grant and an uplink grant identifier corresponding to the uplink grant are sent to the UE such that the UE sends uplink data corresponding to the uplink grant and a first uplink grant identifier to the base station. The first uplink grant identifier is an uplink grant identifier that is last received by the UE before the uplink grant is received. A second uplink grant identifier is obtained when the first uplink grant identifier and the uplink data that are sent by the UE are received, and the second uplink grant identifier is an uplink grant identifier that is last sent by the base station before the uplink grant is sent to the UE. If the first uplink grant identifier and the second uplink grant identifier are the same, it is determined that a last uplink grant sent to the UE is not lost. A next uplink grant and an uplink grant identifier corresponding to the next uplink grant are sent to the UE, and the last uplink grant is an uplink grant that is last sent to the UE before the uplink grant.

Further, if the first uplink grant identifier and the second uplink grant identifier are different, it is determined that a last uplink grant sent to the UE is lost. In this case, the base station may resend the last uplink grant to the UE to reduce the delay of sending the uplink data by the UE.

It should be noted that in this embodiment of the present disclosure, the UE sends the uplink data to the base station using a packet data unit (PDU) at a Media Access Control (MAC) layer. Therefore, the UE may add the uplink grant identifier to the PDU at the MAC layer.

In this embodiment of the present disclosure, if receiving a second BSR sent by UE, a base station calculates an uplink data amount scheduled in a period between a first sending time and a second BSR receiving time, calculates a difference between an uplink data amount carried in the second BSR and the scheduled uplink data amount, and determines the calculated difference as a to-be-scheduled uplink data amount. The to-be-scheduled uplink data does not include uplink data corresponding to a first BSR, thereby avoiding redundancy of scheduled resources, and saving scheduled resources.

Figure 15:
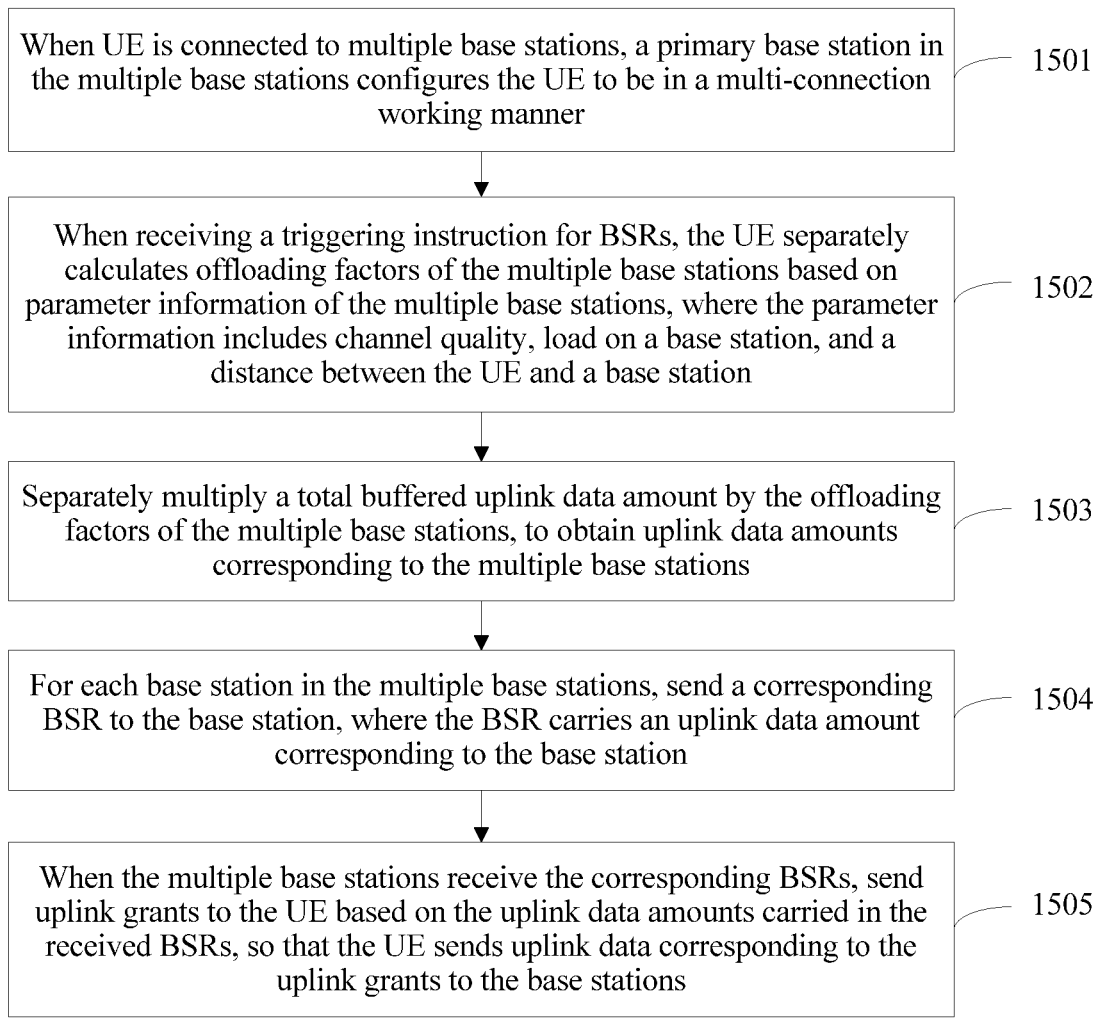
FIG. 15 is a flowchart of a sixth data transmission method according to an embodiment of the present disclosure.

UE may not only be connected to one base station, but may also be connected to multiple base stations. When the UE is connected to multiple base stations, the UE may receive downlink data sent by the multiple base stations. The UE may send uplink data to the multiple base stations. When the UE sends the uplink data to the multiple base stations, the multiple base stations may include a primary base station and multiple secondary base stations. The UE may send a BSR to the primary base station, and the primary base station forwards the BSR to the secondary base stations. Alternatively, the UE may divide a total uplink data amount of the UE according to a fixed proportion, and separately send a corresponding BSR to the multiple base stations. When a base station has no uplink resource, the base station cannot schedule uplink data of the UE, thereby causing delayed sending of the uplink data of the UE. Therefore, an embodiment of the present disclosure provides a data transmission method in which a delay of sending the uplink data by the UE can be reduced. FIG. 15 is a flowchart of a sixth data transmission method according to an embodiment of the present disclosure. Referring to FIG. 15, the method includes the following steps:

Step 1501: When UE is connected to multiple base stations, a primary base station in the multiple base stations configures the UE to be in a multi-connection working manner.

Packet data convergence protocol (PDCP) layers of the multiple base stations are connected to each other when the UE is connected to the multiple base stations. In addition, the UE may send uplink data to any base station in the multiple base stations when the primary base station in the multiple base stations configures the UE to be in a multi-connection working manner.

Step 1502: When a triggering instruction for BSRs is received, the UE separately calculates offloading factors of the multiple base stations based on parameter information of the multiple base stations, where the parameter information includes channel quality, load on a base station, and a distance between the UE and a base station.

In an embodiment, the parameter information of the multiple base stations is obtained when the triggering instruction for the BSRs is received. Offloading parameters corresponding to the multiple base stations are separately calculated based on the parameter information of the multiple base stations. For each base station in the multiple base stations, a proportion of an offloading parameter corresponding to the base station in a total offloading parameter is calculated. The total offloading parameter is a sum of the offloading parameters corresponding to the multiple base stations. The calculated proportion is determined as an offloading factor of the base station.

A specific operation of separately calculating, by the UE, the offloading parameters corresponding to the multiple base stations based on the parameter information of the multiple base stations may be for any base station in the multiple base stations, calculating, based on parameter information of the base station, an offloading parameter corresponding to the base station according to the following formula (2)

$$F = \frac{q}{f \times d} \quad (2)$$

In the foregoing formula (2), F is the offloading parameter corresponding to the base station, q is channel quality included in the parameter information, f is load on the base station that is included in the parameter information, and d is a distance between the UE and the base station.

For each base station in the multiple base stations, a specific operation of calculating a proportion of an offloading parameter corresponding to the base station in the total offloading parameter may be adding the offloading parameters corresponding to the multiple base stations, to obtain the total offloading parameter, and separately dividing the offloading parameter corresponding to each base station by the total offloading parameter, to obtain proportions of the offloading parameters corresponding to the multiple base stations in the total offloading parameter.

It should be noted that in this embodiment of the present disclosure, a sum of the proportions of the offloading parameters corresponding to the multiple base stations in the total offloading parameter is 1. Therefore, when there are two base stations, a proportion of an offloading parameter corresponding to either of the two base stations in the total offloading parameter may be calculated, and a proportion of an offloading parameter corresponding to the other base station in the total offloading parameter is obtained by subtracting the calculated proportion from 1.

Step 1503: Separately multiply a total buffered uplink data amount by the offloading factors of the multiple base stations, to obtain uplink data amounts corresponding to the multiple base stations.

The total uplink data amount is a total amount of uplink data buffered on logical channels corresponding to the BSRs. The uplink data amounts corresponding to the multiple base stations are uplink data amounts that need to be carried in the BSRs reported by the UE to the multiple base stations.

Step 1504: For each base station in the multiple base stations, send a corresponding BSR to the base station, where the BSR carries an uplink data amount corresponding to the base station.

For example, the UE is connected to two base stations, which are a base station 1 and a base station 2. An uplink data amount corresponding to the base station 1 is p1, and an uplink data amount corresponding to the base station 2 is p2. In this case, an uplink data amount carried in a BSR that is sent by the UE to the base station 1 is p1, and an uplink data amount carried in a BSR that is sent to the base station 2 is p2.

Step 1505: When the multiple base stations receive the corresponding BSRs, send uplink grants to the UE based on the uplink data amounts carried in the received BSRs such that the UE sends uplink data corresponding to the uplink grants to the base stations.

In this embodiment of the present disclosure, parameter information of base stations is dynamic and changeable. Therefore, when a BSR triggering instruction is received, UE separately calculates offloading factors of the multiple base stations based on the parameter information of the multiple base stations dynamically to ensure accuracy of a calculated offloading factor, and ensure that the base station can allocate an uplink resource to the UE. A total buffered uplink data amount is separately multiplied by the offloading factors of the multiple base stations, to obtain uplink data amounts corresponding to the multiple base stations, and then corresponding BSRs are reported to the multiple base stations. In this way, it is ensured that buffered uplink data of the UE can be sent to the base stations, and a delay of sending the uplink data by the UE is reduced.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely examples of the present disclosure, but are not intended to limit the present disclosure. Any modification, equivalent replacement, and improvement made without departing from the spirit and principle of the present disclosure shall fall within the protection scope of the present disclosure.

What is claimed is:

1. A data transmission device, comprising:
a receiver configured to receive configuration information from a base station, wherein the configuration information comprises a preset priority sequence that indicates a priority sequence among multiple logical channels of a user equipment (UE) and a priority sequence between uplink data and a periodic buffer status report (BSR) on each logical channel;

a processor coupled to the receiver and configured to:
obtain, based on the preset priority sequence in the configuration information from the base station, a priority of a logical channel to which uplink data that is being sent belongs and a priority of a logical channel to which the periodic BSR belongs when a triggering instruction for triggering the periodic BSR is received; and
determine whether a priority of the uplink data is higher than a priority of the periodic BSR based on the priority of the logical channel to which the uplink data belongs and the priority of the logical channel to which the periodic BSR belongs; and a transmitter coupled to the processor and configured to:
send the uplink data to the base station at a priority higher than the priority of the periodic BSR when the priority of the uplink data is higher than the priority of the periodic BSR; and
send the periodic BSR to the base station at a priority higher than the priority of the uplink data when the priority of the uplink data is lower than the priority of the periodic BSR.

2. The device according to claim 1, wherein the configuration information further comprises a priority identifier, and wherein the processor is further configured to:
determine whether to use the preset priority sequence based on the priority identifier; and
obtain the priority of the logical channel to which the uplink data that is being sent belongs and the priority of the logical channel to which the periodic BSR belongs when determining to use the preset priority sequence.

3. The device according to claim 2, wherein the processor is further configured to:
determine to use the preset priority sequence when the priority identifier is a first character; and
determine not to use the preset priority sequence when the priority identifier is a second character.

4. The device according to claim 1, wherein the processor is further configured to:
determine that the priority of the uplink data is higher than the priority of the periodic BSR when the priority of the logical channel to which the uplink data belongs is higher than the priority of the logical channel to which the periodic BSR belongs; or
determine that the priority of the uplink data is lower than the priority of the periodic BSR when the priority of the logical channel to which the uplink data belongs is lower than or equal to the priority of the logical channel to which the periodic BSR belongs.

5. A data transmission method, wherein the method comprises:
receiving configuration information from a base station, wherein the configuration information comprises a preset priority sequence that indicates a priority sequence among multiple logical channels of a user equipment (UE) and a priority sequence between uplink data and a periodic buffer status report (BSR) on each logical channel;
obtaining, based on the priority sequence in the configuration information from the base station, a priority of a logical channel to which uplink data that is being sent belongs and a priority of a logical channel to which the periodic buffer status report (BSR) belongs when a triggering instruction for triggering the periodic BSR is received;
determining whether a priority of the uplink data is higher than a priority of the periodic BSR based on the priority of the logical channel to which the uplink data belongs and the priority of the logical channel to which the periodic BSR belongs; and
either:
sending the uplink data to the base station at a priority higher than the priority of the periodic BSR when the priority of the uplink data is higher than the priority of the periodic BSR; or
sending the periodic BSR to the base station at a priority higher than the priority of the uplink data when the priority of the uplink data is lower than the priority of the periodic BSR.

6. The method according to claim 5, wherein the preset priority sequence further indicates a priority sequence between uplink data and a periodic BSR on each logical channel, wherein the configuration information further comprises a priority identifier, and wherein before obtaining the priority of the logical channel to which uplink data that is being sent belongs and the priority of the logical channel to which the periodic BSR belongs, the method further comprises determining whether to use the preset priority sequence based on the priority identifier.

7. The method according to claim 6, wherein determining whether to use the preset priority sequence based on the priority identifier comprises:
determining to use the preset priority sequence when the priority identifier is a first character; or
determining not to use the preset priority sequence when the priority identifier is a second character.

8. The method according to claim 5, wherein determining whether the priority of the uplink data is higher than the priority of the periodic BSR based on the priority of the logical channel to which the uplink data belongs and the priority of the logical channel to which the periodic BSR belongs comprises:
determining that the priority of the uplink data is higher than the priority of the periodic BSR when the priority of the logical channel to which the uplink data belongs is higher than the priority of the logical channel to which the periodic BSR belongs; and
determining that the priority of the uplink data is lower than the priority of the periodic BSR when the priority of the logical channel to which the uplink data belongs is lower than or equal to the priority of the logical channel to which the periodic BSR belongs.

9. The device according to claim 1, wherein the configuration information further comprises a priority identifier.

10. A non-transitory computer-readable storage medium storing instructions that, when executed by a processor, cause the processor to:
receive configuration information from a base station, wherein the configuration information comprises a preset priority sequence and a priority identifier, and wherein the preset priority sequence indicates a priority sequence among multiple logical channels of a user equipment (UE) and a priority sequence between uplink data and a periodic buffer status report (BSR) on each logical channel;
obtain a priority of a logical channel to which uplink data that is being sent belongs and a priority of a logical channel to which the periodic BSR belongs when a triggering instruction for triggering the periodic BSR is received;
determine whether a priority of the uplink data is higher than a priority of the periodic BSR based on the priority of the logical channel to which the uplink data belongs and the priority of the logical channel to which the periodic BSR belongs; and either:
- send the uplink data to the base station at a priority higher than the priority of the periodic BSR when the priority of the uplink data is higher than the priority of the periodic BSR; or
- send the periodic BSR to the base station at a priority higher than the priority of the uplink data when the priority of the uplink data is lower than the priority of the periodic BSR.

11. The device according to claim 1, wherein the processor is further configured to determine that the priority of the uplink data is higher than the priority of the periodic BSR when the priority of the logical channel to which the uplink data belongs is higher than the priority of the logical channel to which the periodic BSR belongs.

12. The device according to claim 1, wherein the processor is further configured to determine that the priority of the uplink data is lower than the priority of the periodic BSR when the priority of the logical channel to which the uplink data belongs is lower than or equal to the priority of the logical channel to which the periodic BSR belongs.

13. The method according to claim 6, wherein determining whether to use the preset priority sequence based on the priority identifier comprises determining to use the preset priority sequence when the priority identifier is a first character.

14. The method according to claim 6, wherein determining not to use the preset priority sequence when the priority identifier is a second character.

* * * * *